(12) United States Patent
Li et al.

(10) Patent No.: US 12,086,135 B2
(45) Date of Patent: Sep. 10, 2024

(54) PROBLEM SOLVING IN A DATABASE

(71) Applicant: INTERNATIONAL BUSINESS MACHINES CORPORATION, Armonk, NY (US)

(72) Inventors: Shuo Li, Beijing (CN); Xiaobo Wang, Haidian District (CN); Sheng Yan Sun, Beijing (CN); Min Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/477,801

(22) Filed: Sep. 17, 2021

(65) Prior Publication Data
US 2023/0089667 A1 Mar. 23, 2023

(51) Int. Cl.
*G06F 16/2452* (2019.01)
*G06F 11/14* (2006.01)
*G06F 11/34* (2006.01)
*G06F 16/21* (2019.01)

(52) U.S. Cl.
CPC .... *G06F 16/24524* (2019.01); *G06F 11/1471* (2013.01); *G06F 11/3409* (2013.01); *G06F 16/21* (2019.01)

(58) Field of Classification Search
CPC .............. G06F 16/24524; G06F 16/21; G06F 11/1471; G06F 11/3409
See application file for complete search history.

(56) References Cited

U.S. PATENT DOCUMENTS

| | | | | |
|---|---|---|---|---|
| 7,840,556 B1 * | 11/2010 | Dayal | ................ | G06F 16/2453 707/999.003 |
| 7,877,373 B2 | 1/2011 | Zait | | |
| 8,694,551 B2 * | 4/2014 | Ramamurthy | .......... | G06F 16/21 707/802 |
| 9,110,946 B2 | 8/2015 | Chen et al. | | |
| 9,652,498 B2 | 5/2017 | Beavin et al. | | |

(Continued)

FOREIGN PATENT DOCUMENTS

WO WO-2021179170 A1 * 9/2021

OTHER PUBLICATIONS

Yagoub et al. ("Oracle's SQL Performance Analyzer; Copyright 2008 IEEE") (Year: 2008).*

(Continued)

*Primary Examiner* — Irete F Ehichioya
*Assistant Examiner* — Ken Hoang
(74) *Attorney, Agent, or Firm* — Gavin Giraud; Andrew D. Wright; Calderon Safran & Cole, P.C.

(57) ABSTRACT

A method includes receiving, by a computing device, a Structured Query Language (SQL) query from a user; generating, by the computing device, execution structures from the SQL query; generating, by the computing device, test results by running the SQL query with the execution structures; building, by the computing device, logs which record information of the running of the SQL query; generating, by the computing device, a candidate execution structure using the information from the logs; normalizing, by the computing device, the SQL query using the candidate execution structure; running, by the computing device, the normalized SQL query in a database; and comparing, by the computing device, results of the normalized SQL query to the test results.

20 Claims, 21 Drawing Sheets

(56) References Cited

U.S. PATENT DOCUMENTS

| | | | |
|---|---|---|---|
| 11,003,641 B2 | 5/2021 | Dundjerski et al. | |
| 2015/0081832 A1* | 3/2015 | Handa | H04L 9/0869 709/213 |
| 2022/0156163 A1* | 5/2022 | Pasupuleti | G06F 11/2041 |

OTHER PUBLICATIONS

Mell et al., "The NIST Definition of Cloud Computing", NIST, Special Publication 800-145, Sep. 2011, 7 pages.

Unknown, "Database Performance Tuning Guide", https://docs.oracle.com/cd/E11882_01/index.htm, Apr. 2020, 6 pages.

Unknown, "Database Utilities Using LogMiner to Analyze Redo Log Files", https://docs.oracle.com/cd/B19306_01/nav/portal_6.htm, Jun. 2005, 39 pages.

Jungwoon Lee et al., "Monitoring slow queries in MySQL withCloud Logging and Monitoring", https://cloud.google.com/community/tutorials/stackdriver-monitor-slow-query-mysql, Jul. 10, 2019, 18 pages.

Unknown, "Replaying Logged Transactions", https://docs.oracle.com/cd/E57185_01/index.htm, 2015-2016, 2 pages.

Alex Groce et al., "One Test to Rule Them AH", In Proceedings of 26th International Symposium on Software Testing and Analysis, Santa Barbara, CA, Jul. 2017 (ISSTA'17), 11 pages.

International Search Report and Written Opinion for PCT/EP2022/075633 dated Dec. 12, 2022; 11 Pages.

Rigger et al., "Detecting Optimization Bugs in Database Engines via Non-optimizing Reference Engine Construction", ESEC/FSE '20, Nov. 8-13, 2020; pp. 1140-1153.

Rigger et al., "Finding Bugs in Database Systems via Query Partitioning", Creative Commons Attribution, Proc. ACM Program. Lang., vol. 4, No. OOPSLA, Article 211, November 202; 30 Pages.

* cited by examiner

PROBLEM SOLVING IN A DATABASE

BACKGROUND

Aspects of the present invention relate generally to databases and, more particularly, to problem solving in a database.

Databases include relatively large amounts of data. Accessing the data includes executing a search query, amongst other actions.

SUMMARY

In a first aspect of the invention, there is a computer-implemented method including: receiving, by a computing device, a Structured Query Language (SQL) query from a user; generating, by the computing device, execution structures from the SQL query; generating, by the computing device, test results by running the SQL query with the execution structures; building, by the computing device, logs which record information of the running of the SQL query; generating, by the computing device, a candidate execution structure using the information from the logs; normalizing, by the computing device, the SQL query using the candidate execution structure; running, by the computing device, the normalized SQL query in a database; and comparing, by the computing device, results of the normalized SQL query to the test results.

In another aspect of the invention, there is a computer program product including one or more computer readable storage media having program instructions collectively stored on the one or more computer readable storage media. The program instructions are executable to: receive an SQL query from a user; generate execution structures from the SQL query; generate test results by running the SQL query with the execution structures; build logs which record information of the running of the SQL query; generate a candidate execution structure using the information from the logs; normalize the SQL query using the candidate execution structure; run the normalized SQL query in a database; compare results of the normalized SQL query to the test results; and in response to determining the results of the normalized SQL query do not match the test results, notify the user the results do not match the test results.

In another aspect of the invention, there is system including a processor, a computer readable memory, one or more computer readable storage media, and program instructions collectively stored on the one or more computer readable storage media. The program instructions are executable to: receive an SQL query from a user; generate execution structures from the SQL query; generate test results by running the SQL query with the execution structures; build logs which record information of the running of the SQL query; generate a candidate execution structure using the information from the logs; normalize the SQL query using the candidate execution structure; run the normalized SQL query in a database; compare results of the normalized SQL query to the test results; and in response to determining the results of the normalized SQL query match the test results, end a repair process.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
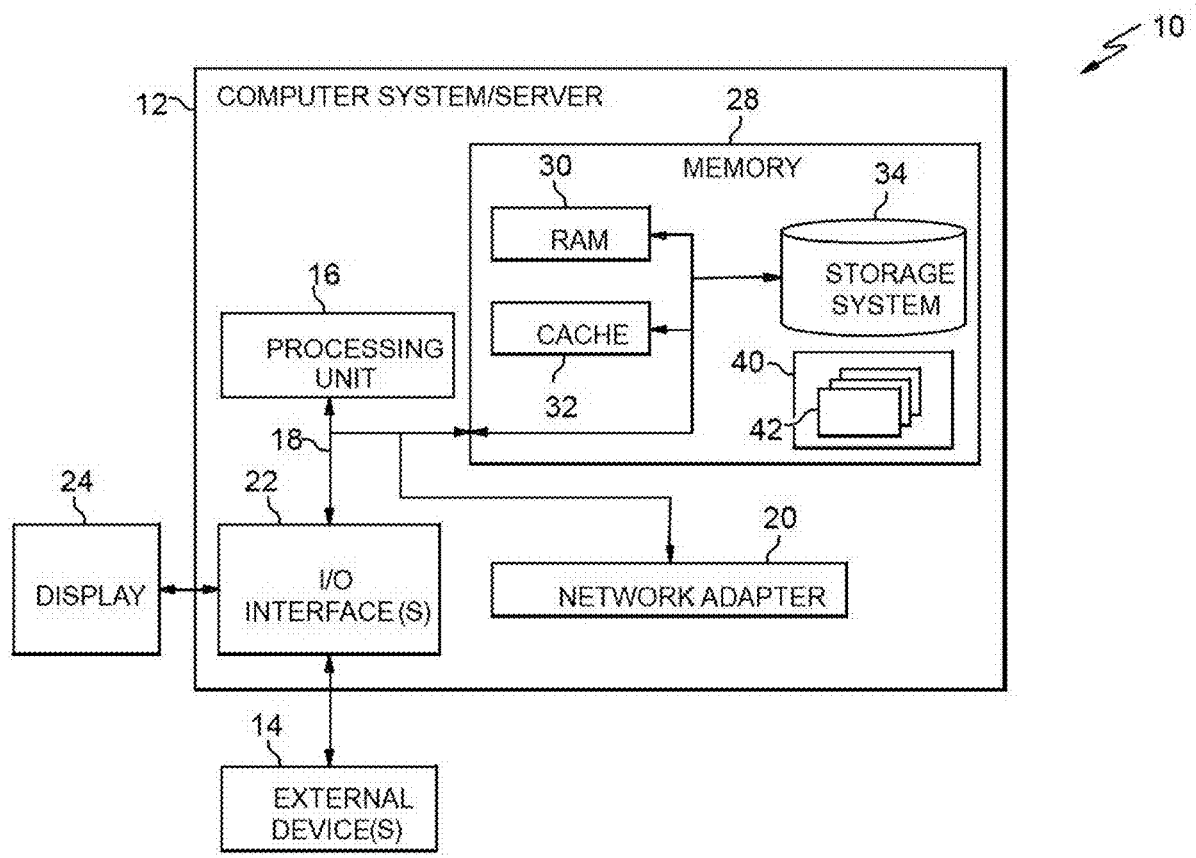
FIG. 1 depicts a cloud computing node according to an embodiment of the present invention.

Aspects of the present invention relate generally to databases and, more particularly, to problem solving in a database. According to aspects of the invention, a system detects problems within levels of a database. In embodiments, the systems and processes self-diagnose these problems and solve these problems by repairing the SQL query and/or the database. In this manner, implementations of the invention allow for self-governance of the database and also for an autonomous ecosystem which utilizes the database.

In embodiments, systems and processes provide solutions to problems within databases by preparing a double check-out result set, i.e., test results. In preparing the test results, the systems and processes select new access plans having different execution structures for a particular Structured Query Language (SQL) query. By selecting new access plans for the SQL query, the SQL query is able to be re-run with the different execution structures of the new access plans. In embodiments, the systems and processes select a new access plan in view of policies, e.g., a relatively safer policies. In embodiments, to generate result sets, the SQL query is re-run with the different execution structures, and is also re-run within a different database. In embodiments, to identify a correct result set, the systems and processes divide the result sets into groups in view of whether the records are in order or not in order, and compares the result sets within the groups to identify correct results. Specifically, in view of a match between the result sets, the systems and processes identify these result sets as a correct result set, thereby generating test results. In further embodiments, the systems and processes normalize the different execution structures prior to comparing the result sets to reduce a calculation of the result sets, an execution of the execution structures, and a result set comparison effort.

In embodiments, the process continues by building new logs within the database. In building the new logs, the systems and processes build a replay log to record various information of the re-running of SQL query, e.g., a SQL execution sequence, a SQL text, and a corresponding active transaction ID list. The building of the new logs further includes adding a confirm log to record a result set resulting from the re-running of the SQL query, along with corresponding performance parameters. Examples of performance parameters include a CPU cost for SQL correctness and performance issue verification.

In embodiments, in view of the information within the replay log and the confirm log, the systems and processes continue by generating a new access plan which includes a new candidate execution structure. To generate the new access plan, the systems and processes build an execution structure matrix which includes the new access plan. In embodiments, the systems and processes build the execution structure matrix from the information within the replay log, which include real time statistics of the re-running of the SQL query. In embodiments, the systems and processes normalize the SQL query in view of the candidate execution structure of the new access plan to normalize the SQL query and also to aggregate a function evaluation for reducing execution effort for the SQL query.

In embodiments, the systems and processes re-evaluate the normalized SQL query by comparing the result sets of the normalized SQL query to the test results to identify a scope of the problem. In further embodiments, the systems and processes compare the performance of the SQL query and the normalized SQL query. In embodiments, in response to determining a match between the result sets of the normalized SQL query and the test results, the systems and processes identify the scope of the problem being in the SQL query and not the database. Alternatively, in response to determining the result sets of the normalized SQL query and the test results do not match, the systems and processes identify the scope of the problem being in the database. In embodiments, instances of diagnosing the scope of the problem and the repairs of the problem allows for an enrichment of a knowledge center. In this way, the systems and processes merge instances of self-diagnosis of the problems and instances of self-healing of the problems together into the knowledge center.

Implementations of the invention provide improvements to computer technologies by improving databases. Specifically, aspects of the invention improve databases by identifying a problem from an SQL query or a database and repairing the problem. To identify and repair the problem, the systems and processes receive an original SQL query. In response to receiving the original SQL query, the systems and processes generate different execution structures to re-run the original SQL query, along with re-running the original SQL query within a different database using the different execution structures. The systems and processes take result sets from the re-running of the original SQL query, and compares these result sets to one another to find any matching result sets. In response to determining a match, the systems and processes identify these matching result sets as a test result. In embodiments, aspects of the invention build an event replay log to the database for recording information regarding the re-running of the original SQL query. Additionally, the systems and processes build a confirm log to the database for recording additional information regarding the re-running of the SQL query. In embodiments, aspects of the invention generate a new access plan having a candidate execution structure from the information within the event replay log. In embodiments, aspects of the invention normalize the original SQL query by normalizing an original execution structure of the SQL query with the candidate execution structure. In embodiments, the systems and processes run the normalized SQL query and compare the results to the test results. In view of determining the results of the normalized SQL query match the test results, the systems and processes end the repair process since the problem was in the original SQL query and no longer is present since the results match the test results. Alternatively, in response to the results of the normalized SQL query not matching the test results, the systems and processes apply a patch to the database, since the problem is in the database. In embodiments, aspects of the invention train a knowledge center by merging instances of problem diagnosis and repairs so that the systems and processes are able to diagnose and repair the SQL query or the database in response to future problems. Accordingly, aspects of the invention improve computer technology by detecting a problem in a SQL query or a database and repairing the problem.

Implementations of the invention also allow for the practical application of problem detection and repairing the problem. In embodiments, aspects of the invention detect whether a problem is within an original SQL query or within the database by receiving the original SQL query and generating different execution structures for re-running the original SQL query. Further, the systems and processes re-runs the original SQL query with the different execution structures within a database and also within a different database. The systems and processes take result sets from the re-running of the original SQL query, and compares these result sets to one another to find any matching result sets. In response to determining a match, the systems and processes identify these matching result sets as a test result. In embodiments, aspects of the invention build an event replay log to the database for recording information regarding the re-running of the original SQL query. Additionally, the systems and processes build a confirm log to the database for recording additional information regarding the re-running of the SQL query. In embodiments, aspects of the invention generate a new access plan having a candidate execution structure from the information within the event replay log. In further embodiments, aspects of the invention normalize the original SQL query with the candidate execution structure. In embodiments, the systems and processes run the normalized SQL query and compare the results to the test results. In view of determining the results of the normalized SQL query match the test results, the systems and processes end the repair process since the problem was in the original SQL query and no longer is present since the results are correct. Alternatively, in response to the results of the normalized SQL query not matching the test results, the systems and processes apply a patch to the database, since the problem is in the database. In embodiments, aspects of the invention train a knowledge center by merging instances of problem diagnosis and repairs so that the systems and processes are able to diagnose and repair a new SQL query or the database in response to future problems. Accordingly, aspects of the invention provide the practical application of detecting a problem in computing technology and repairing the problem.

In addition, the steps for detecting a problem and repairing the problem are unconventional. In embodiments, aspects of the invention: a) receive an SQL query from a user; b) generate execution structures from the SQL query; c) generate test results by running the SQL query with the execution structures; d) build logs to record information of the running of the SQL query; d) generate a candidate execution structure in view of the information from the logs;

e) normalize the SQL query in view of the candidate execution structure; f) normalize the SQL query in view of the candidate execution structure; g) run the normalized SQL query in a database; h) compare results of the normalized SQL query to the test results; i) in response to a match, end repair process; j) in response to not matching, notify the user the results do not match the test results; and k) train a knowledge center. In view of this unconventional arrangement of steps, embodiments detect a problem in computing technology and repair the problem.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
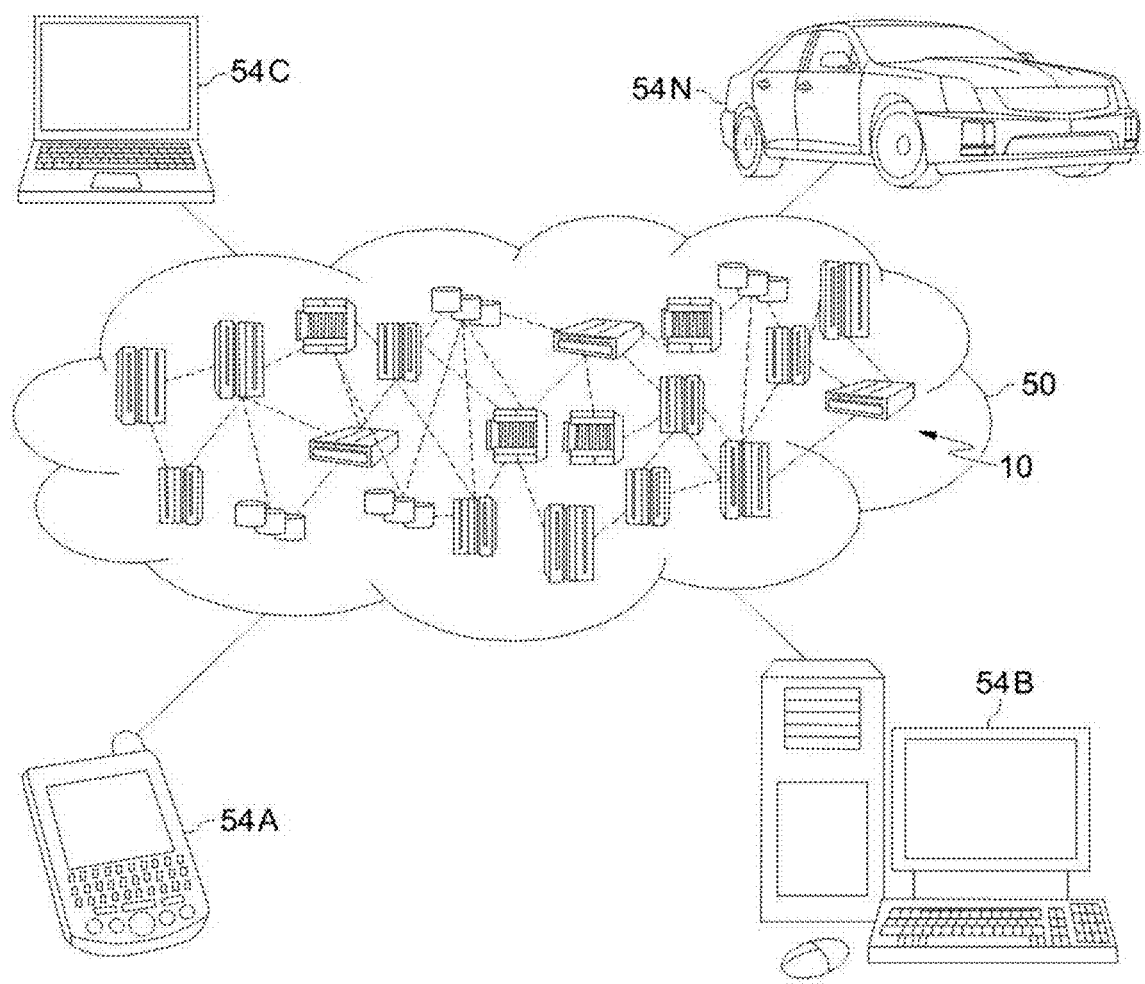
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
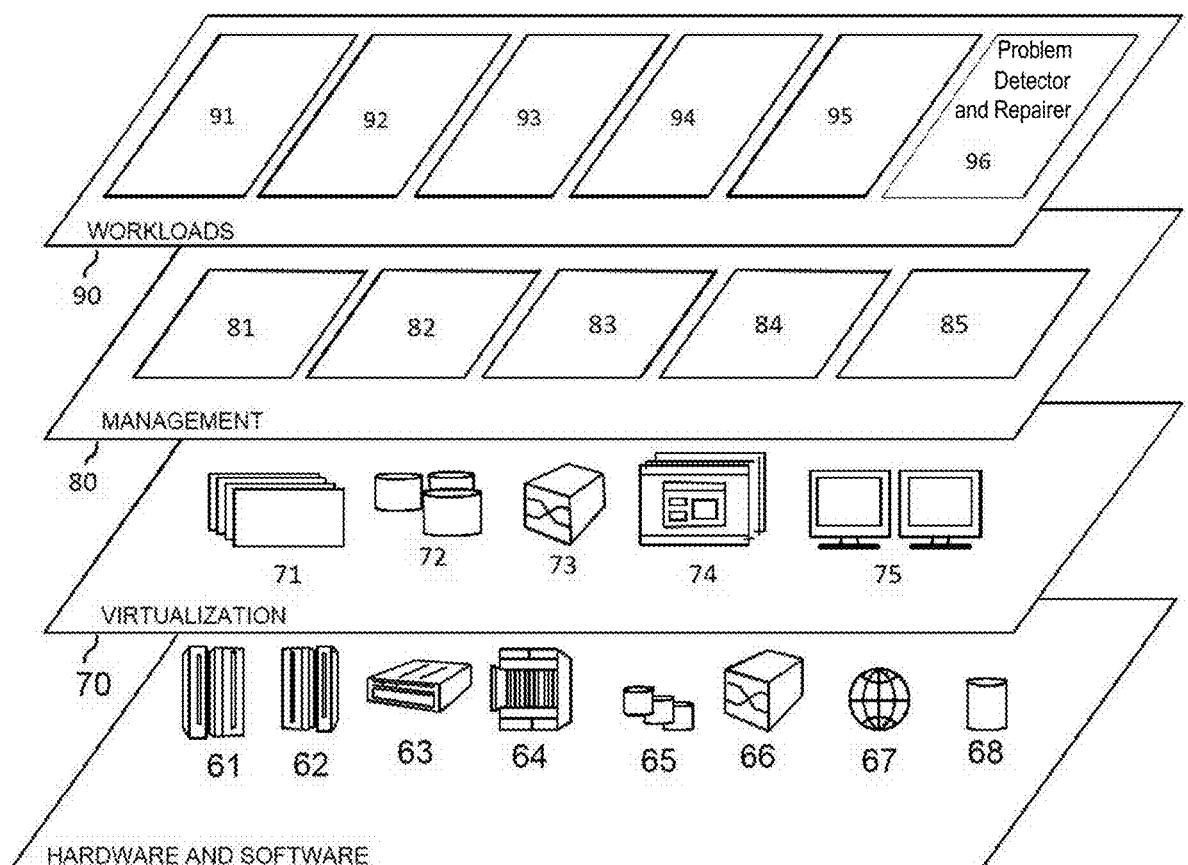
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and problem detector and repairer 96.

Implementations of the invention may include a computer system/server 12 of FIG. 1 in which one or more of the program modules 42 are configured to perform (or cause the computer system/server 12 to perform) one of more functions of the problem detector and repairer 96 of FIG. 3. For example, the one or more of the program modules 42 may be configured to: a) receive an SQL query from a user; b) generate execution structures from the SQL query; c) generate test results by running the SQL query with the execution structures; d) build logs which record information of the running of the SQL query; e) generate a candidate execution structure using the information from the logs; f) normalize the SQL query using the candidate execution structure; g) run the normalized SQL query in a database; h) compare results of the normalized SQL query to the test results; i) in response to a match, end repair process; j) in response to not matching, notify the user the results do not match the test results; and k) train a knowledge center.

Figure 4:
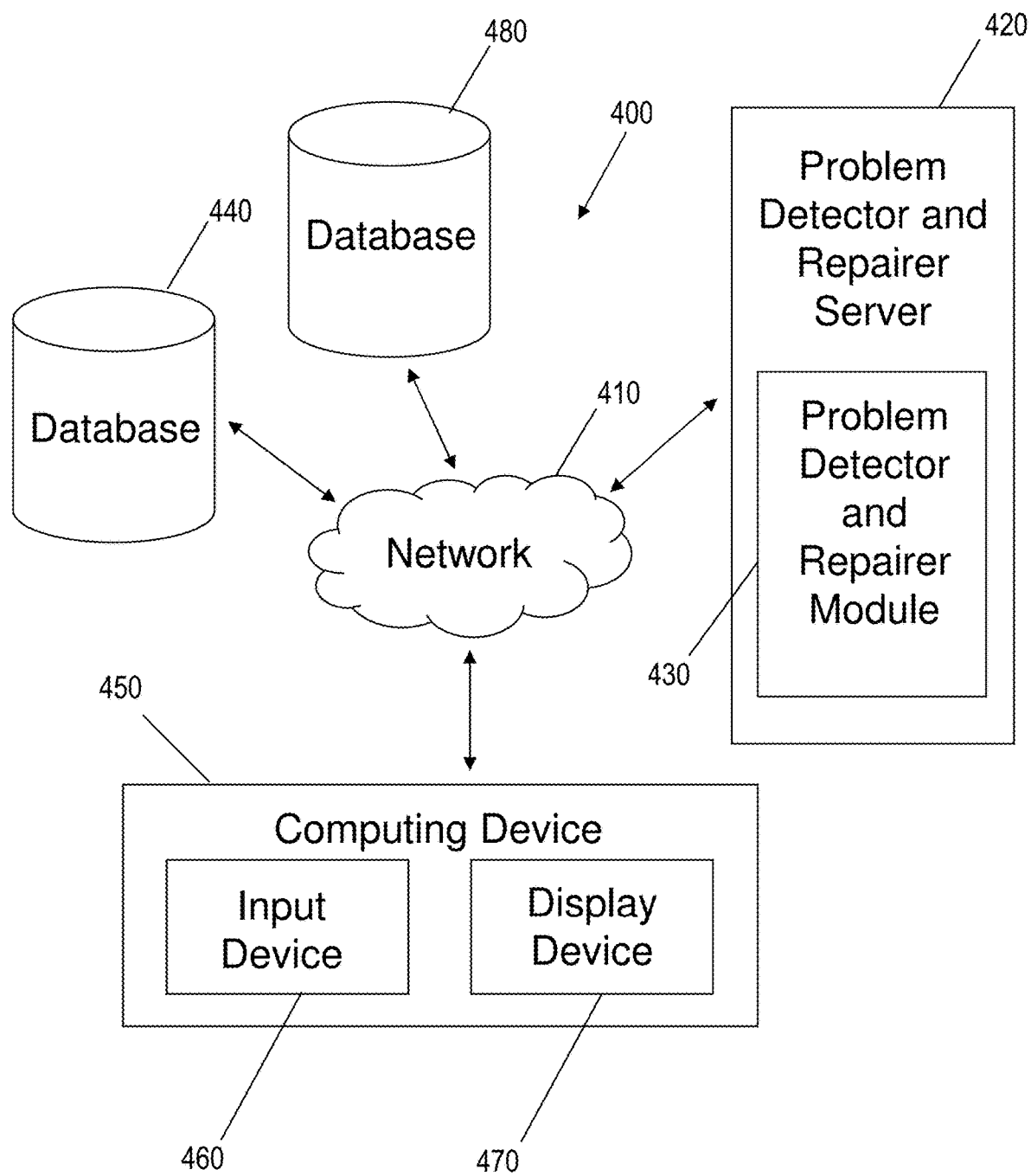
FIG. 4 shows a block diagram of an exemplary environment in accordance with aspects of the invention.
Figure 5A:
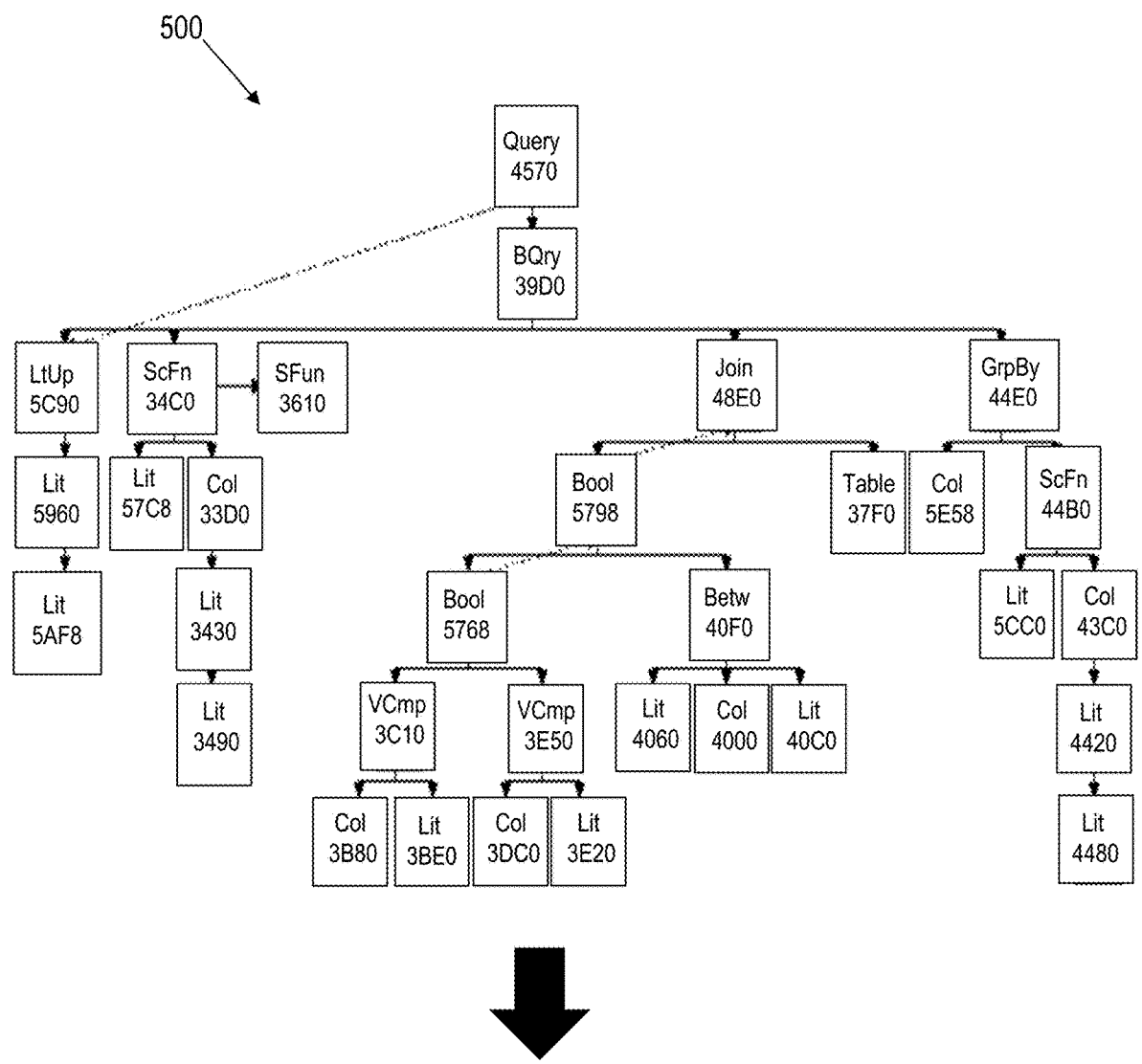
FIGS. 5A-5D show generation of execution structures in response to receiving an SQL query in accordance with aspects of the invention.
Figure 5B:
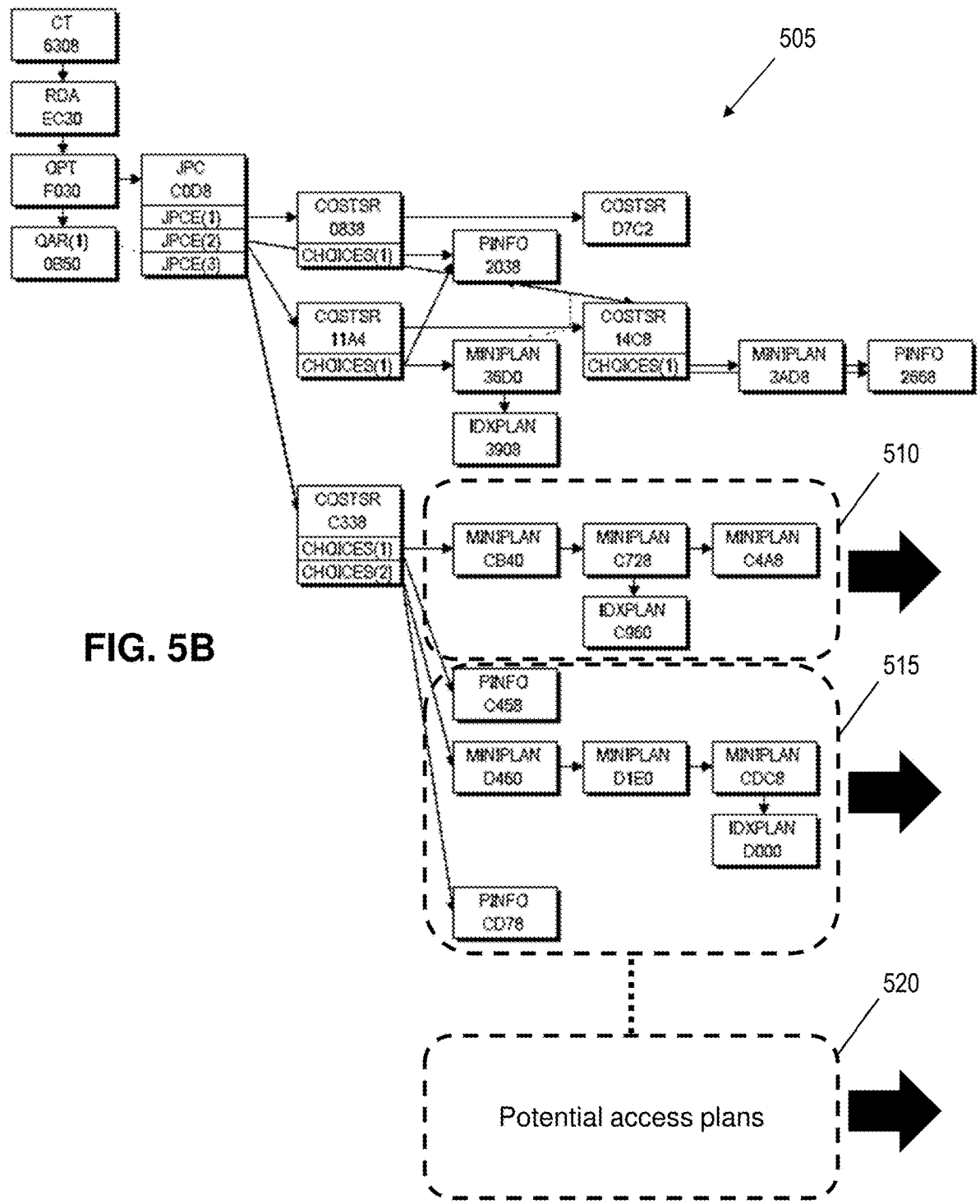
Figure 5C:
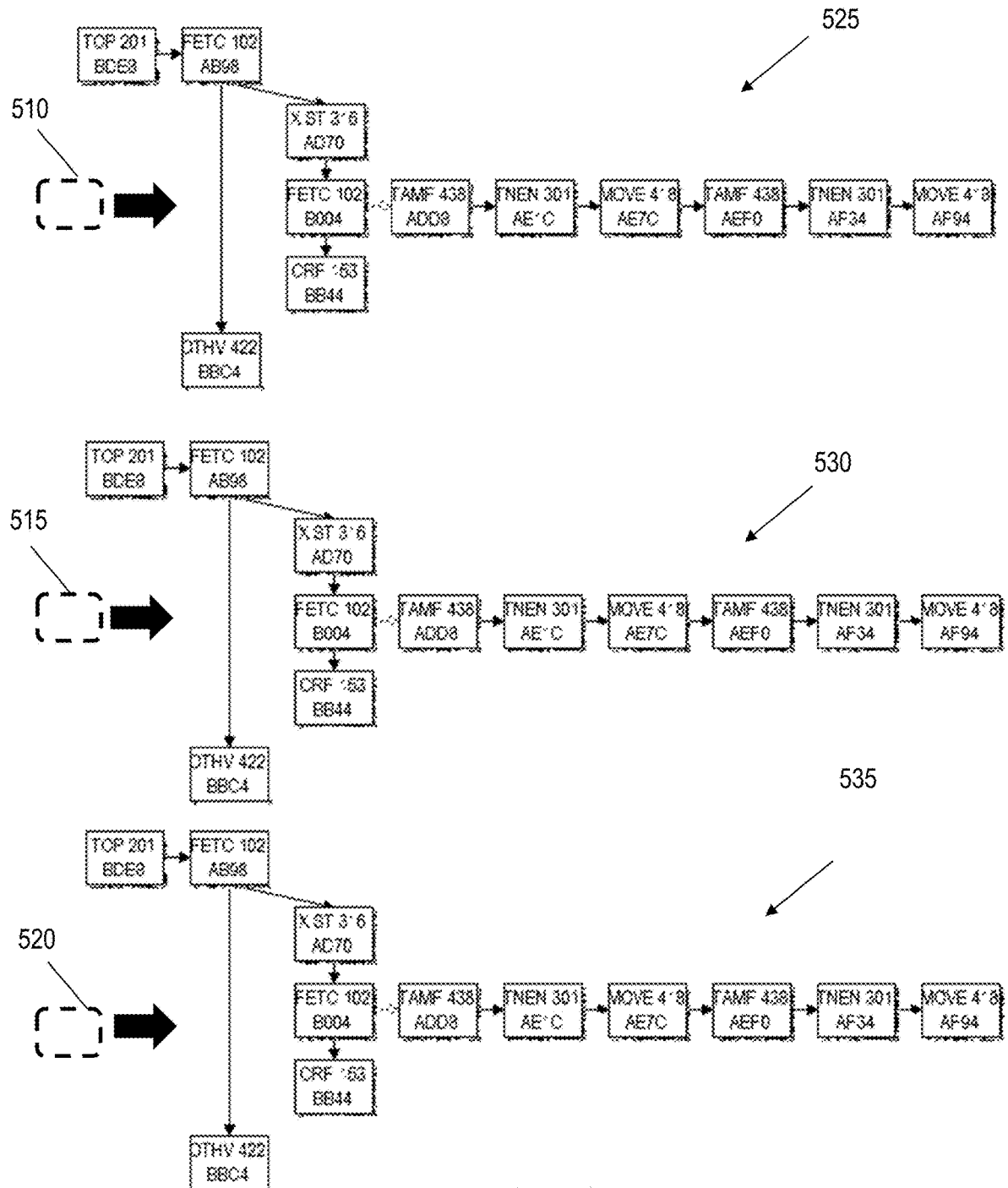
Figure 5D:
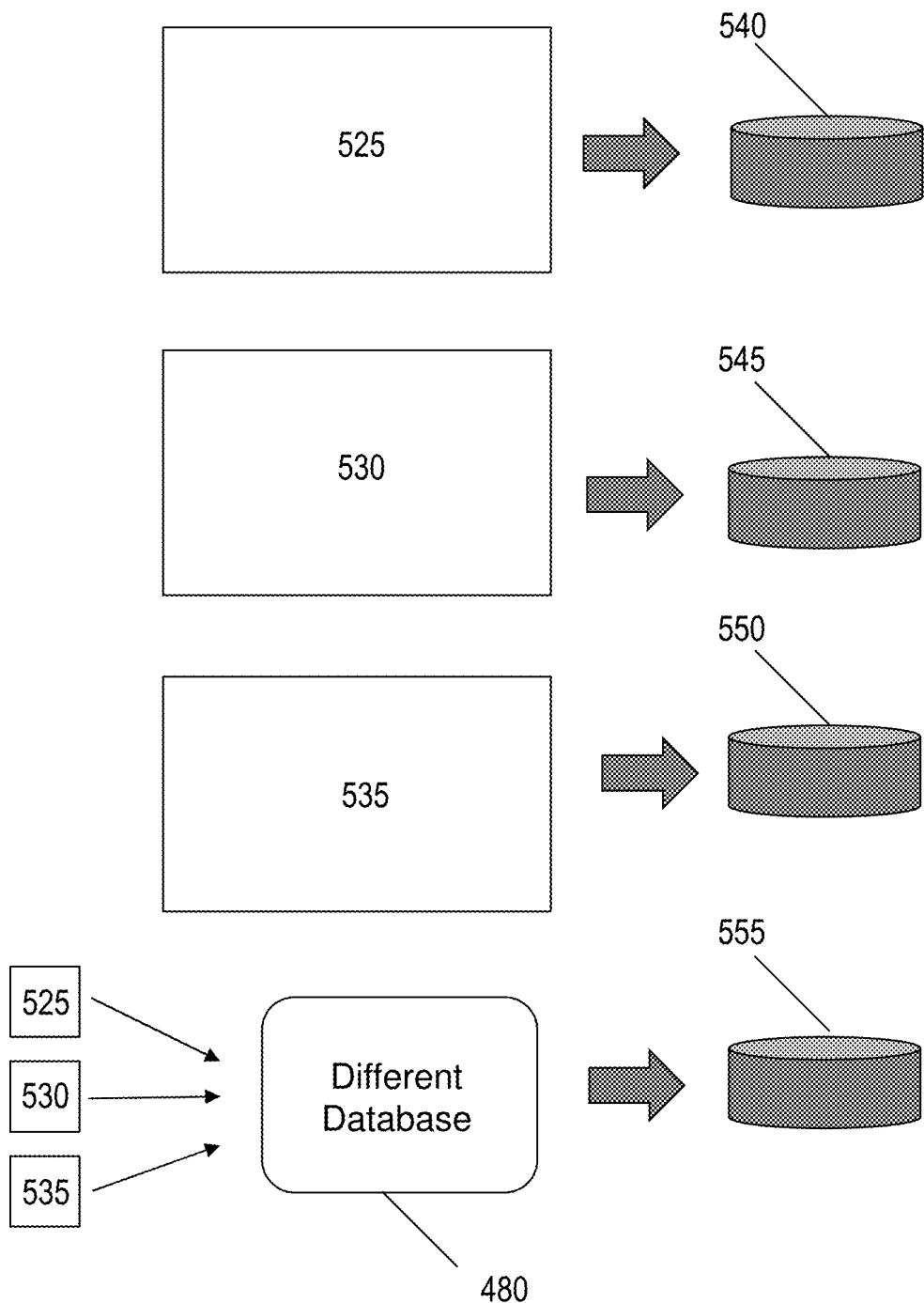

FIG. 4 shows a block diagram of an exemplary environment in accordance with aspects of the invention. In embodiments, the environment 400 includes a network 410, a problem detector and repairer server 420, a database 440, and a computing device 450 that includes an input device 460 and a display device 470 for viewing result sets of a Structured Query Language (SQL) query. In embodiments, the computing device 450 is a user device, e.g., a desktop computer, a laptop computer, a tablet, a smartphone, amongst other examples, comprising one or more components of computer system/server 12 of FIG. 1. The problem detector and repairer server 420 is a computing device comprising one or more components of computer system/server 12 of FIG. 1.

In embodiments, the problem detector and repairer server 420 comprises a problem detector and repairer module 430, which comprises one or more program modules such as program modules 42 described with respect to FIG. 1. The problem detector and repairer server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

Problems arising from databases include potential database defects or potential query performance issues when a database is on-site. Examples of why these problems arise include the database lacking a software patch, amongst other reasons.

In embodiments, the problem detector and repairer module 430 detects problems arising from the database 440, in response to receiving an original SQL query from a user. In embodiments, the database 440 is a relational database which stores data in tables as rows and columns. In embodiments, a SQL query includes a relational database specific programming language which allows for retrieving data from the tables within the relational database. In embodiments, a SQL query includes statements for performing a sequence of operations for retrieving the data. In further embodiments, statements of a SQL query include syntax for instructing operators to perform specific actions. As an example, syntax of the statements include letters, digits, and special characters, amongst other examples.

In embodiments, a user enters the original SQL query through the input device 460 of the computing device 450 to retrieve the data from the database 440. An example of a user is a software developer, a software engineer, a software architect, a programmer, or other software professional, amongst other examples. In embodiments, the user views a result set of the data on the display device 470 of the computing device 450. In view of the user's database knowledge, the user determines that the result set is incorrect. In embodiments, the user sends the original SQL query to the problem detector and repairer module 430 for analysis using the input device 460.

FIGS. 5A-5D illustrate a preparation for generating test results, i.e., double checkout result sets, in accordance with aspects of the invention. In embodiments, the problem detector and repairer module 430 of FIG. 4 prepares the test results in response to receiving the original SQL query from the user through the network 410, and is described with reference to elements depicted in FIG. 4.

In embodiments, after receiving the original SQL query from the user, the problem detector and repairer module 430 begins the preparation of the test results by parsing the syntax within the statements of the original SQL query. In embodiments, the problem detector and repairer module 430 parses the syntax into nodes at a parser level of the database 440, thereby generating a parse tree 500. In embodiments, the parse tree 500 includes various branches, with each branch of the parse tree 500 connecting nodes of the syntax to one another and to the original SQL query.

In embodiments, in response to generating the parse tree 500, the problem detector and repairer module 430 continues preparing the test results by generating execution structures execution structures 525, 530, 535 in view of the parse tree 500. In embodiments, the problem detector and repairer module 430 generates the execution structures 525, 530, 535 by generating an access plan map using the parse tree 500, and selecting access plans 510, 515, 520 from the access plan map 505.

In embodiments, the access plan map 505 contains a plurality of access plans for satisfying the nodes and branches of the parse tree 500. In embodiments, each access plan contains information regarding which data to retrieve from the database 440 in view of the nodes of the parse tree 500, and how to retrieve this data from the database 440. In embodiments, the information on how to retrieve the data is in a form of an execution structure. In embodiments, an execution structure describes operators for satisfying an SQL query by detailing a logical path for executing the statements of the SQL query. In embodiments, the access plan 510 contains the execution structure 525, the access plan 515 contains the execution structure 530, and the access plan 520 contains the execution structure 535.

In embodiments, the problem detector and repairer module 430 selects the access plans 510, 515, 520 from the access plan map 505 to generate execution structures 525, 530, 535. In embodiments, the problem detector and repairer module 430 uses an optimizer to select the access plans 510, 515, 520 from the access plan map 505. In embodiments, the optimizer selects an access plan of the access plans 510, 515, 520 by identifying access plans which satisfy specific policies. As an example, the optimizer selects an access plan of the access plans 510, 515, 520 in view of a cost policy. In embodiments, the cost policy indicates an access plan which uses a least amount of computing resources to execute a SQL query. In embodiments, in response to the optimizer recognizing that the access plan 510 has a shorter logical path than the access plans 515, 520, the optimizer selects access plan 510 to satisfy the cost policy since the relatively shorter logical path consumes a least amount of computing resources in comparison to the logical paths of the access plans 515, 520. As another example, the optimizer selects an access plan of the access plans 510, 515, 520 in view of a relatively safest policy. In embodiments, the relatively safest policy indicates an access plan which retrieves a relatively larger number of columns of data from the tables of the database 440 in comparison to other access plans. In response to the optimizer recognizing that the access plan 515 has a greater number of operators for retrieving data than the access plans 510, 520, the optimizer selects access plan 515 to satisfy the relatively safest policy. In embodiments, potential access plans 520 correspond to a number of policies the optimizer satisfies. As an example, if there are four more policies to satisfy, the optimizer selects four more access plans as the potential access plans 520 to satisfy these four more policies.

In embodiments, in view of the problem detector and repairer module 430 selecting the access plans 510, 515, 520, the problem detector and repairer module 430 uses the corresponding execution structures 525, 530, 535 of the access plans 510, 515, 520 to re-run the original SQL query within the database 440. In embodiments, the problem detector and repairer module 430 obtains the result set 540 by running the original SQL query using the execution structure 525. Further, the problem detector and repairer module 430 obtains the result set 545 by running the original SQL query using the execution structure 530. In addition, the problem detector and repairer module 430 obtains the result set 550 by running the original SQL query using the execution structure 535.

In embodiments, the problem detector and repairer module 430 also runs the SQL query in a different database 480 through the network 410. In embodiments, the problem detector and repairer module 430 uses any one of the execution structures 525, 530, 535 or any combination of execution structures 525, 530, 535 to re-run the original SQL query in the different database 480. In this way, the problem detector and repairer module 430 runs the SQL query using the execution structures 525, 530, 535 in a plurality of databases 440, 480. In embodiments, in response to not having permission to access the different database 480, the problem detector and repairer module 430 requests permission from a database administrator of the different database 480 to run the SQL query using the execution structures 525, 530, 535. In embodiments, the problem detector and repairer module 430 obtains the result set 555 by running the SQL query in the different database 480.

FIGS. 6A-6F illustrate a comparison of the result sets 540, 545, 550, 555 to generate the test results 605, 615 in accordance with aspects of the invention. In embodiments, the problem detector and repairer module 430 of FIG. 4 compares the result sets 540, 545, 550, 555 to generate the test result 605, 615, and is described with reference to elements depicted in FIGS. 4 and 5A-5D. In embodiments, the problem detector and repairer module 430 generates the test results 605, 615 by dividing the result sets 540, 545, 550, 555 into groups 600, 600a, 610 and comparing the records within the result sets 540, 545, 550, 555 within the groups 600, 600a, 610. In embodiments, result sets of the result sets 540, 545, 550, 555 are an equal result set since their records match.

Figure 6A:
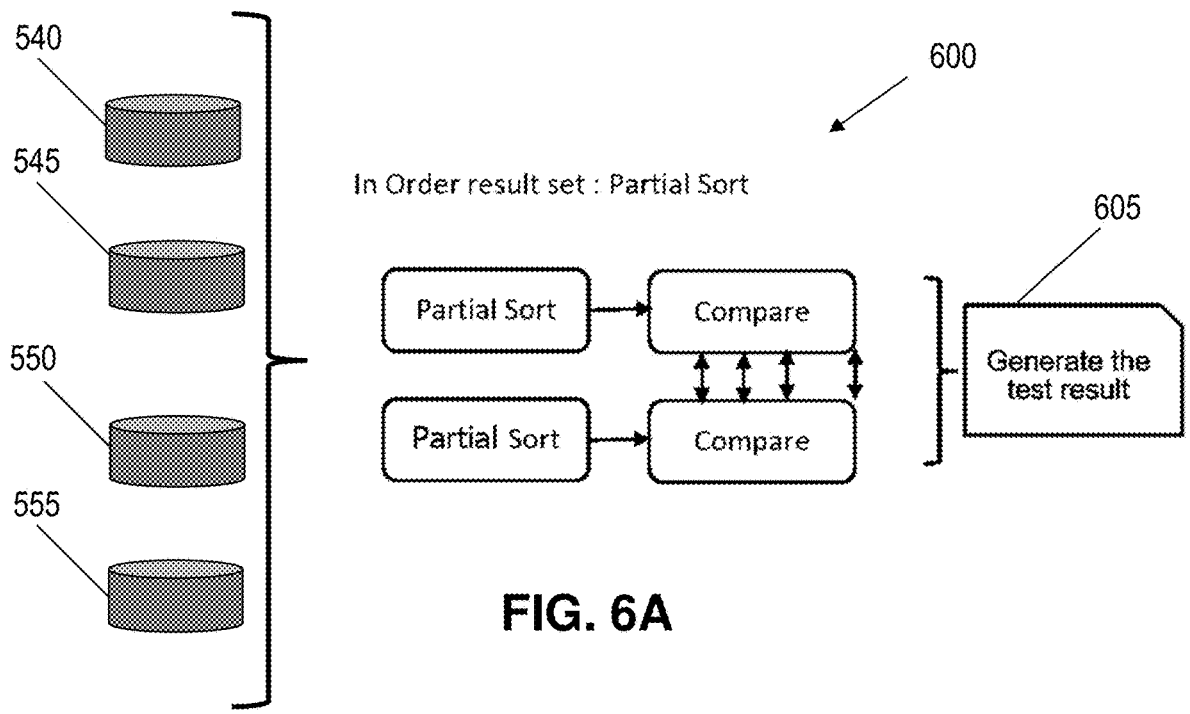
FIGS. 6A-6F show a sorting of SQL query result sets resulting from running the SQL query with the execution structures of FIGS. 5A-5E in accordance with aspects of the invention.
Figure 6B:
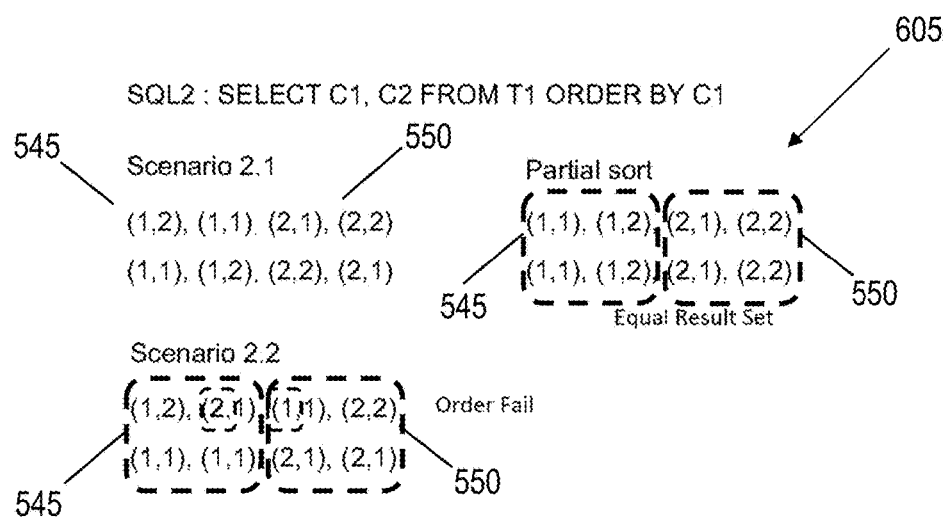
Figure 6C:
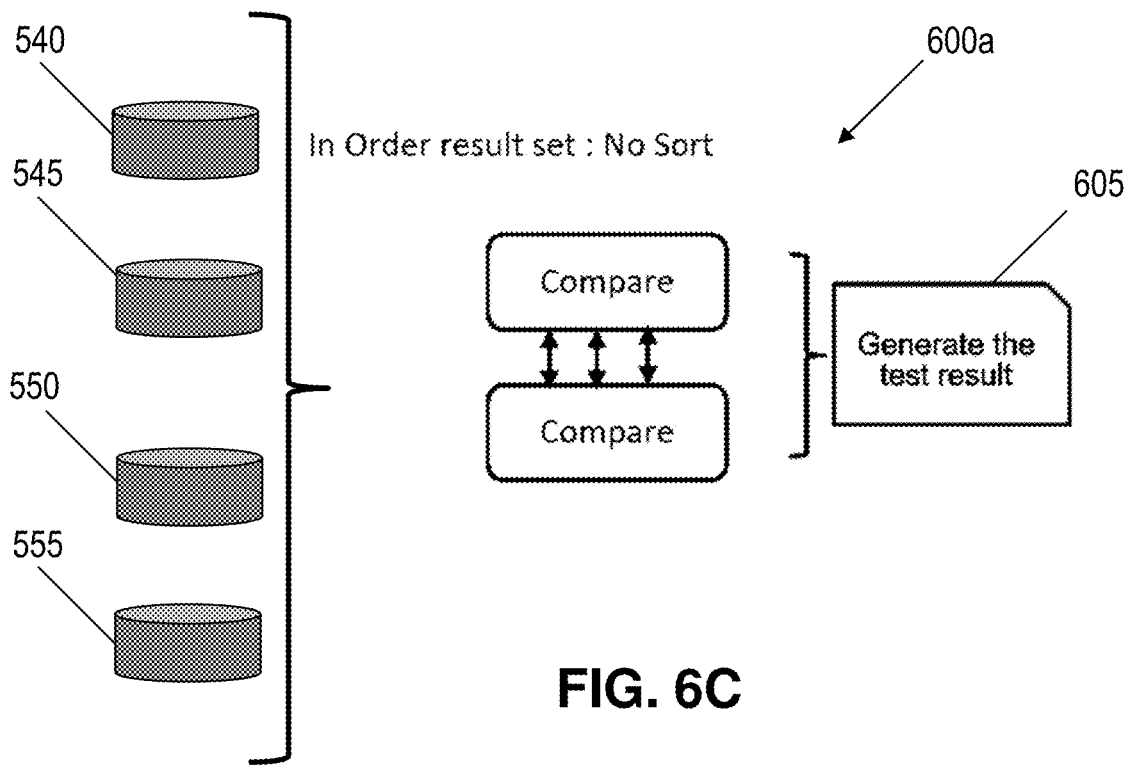
Figure 6D:
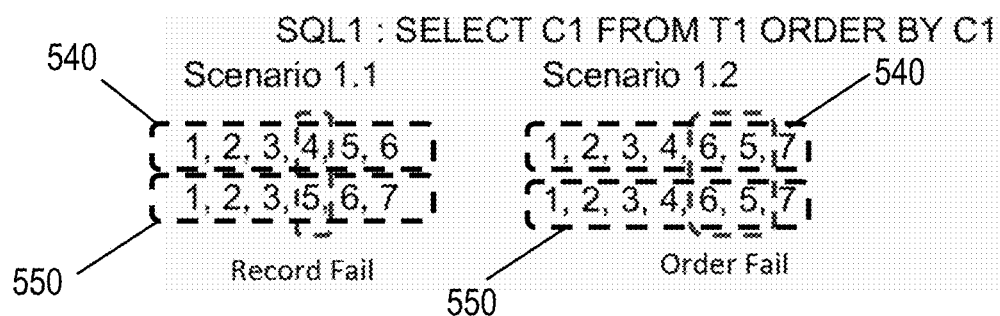

In embodiments, the problem detector and repairer module 430 divides the result sets 540, 545, 550, 555 into groups 600, 600a, 610 in view of the records of the result sets 540, 545, 550, 555 being in order or not being in order. Specifically, groups 600, 600a represent scenarios where records of the result sets 540, 545, 550, 555 are in order, while group 610 represents a scenario where the records of the result sets 540, 545, 550, 555 are not in order. In embodiments, records are in order if they result from execution structures which include "ORDER BY" clauses. Alternatively, records are not in order if they result from execution structures which do not include "ORDER BY" clauses. An example of an "ORDER BY" clause is statement to arrange the records in an ascending order. As a further example, FIG. 6D illustrates the result set 540 having records in ascending order, e.g., "1, 2, 3, 4, 5, 6."

In embodiments, for group 600, the problem detector and repairer module 430 partially sorts the records of the result sets 540, 545, 550, 555. As an example, for a second SQL query (SQL2) using the execution structures 530, 535, the records from column 1 (C1) and column 2 (C2) of Table 1 (T1) of result sets 545, 550 are shown in FIG. 6B. Under Scenario 2.1 of FIG. 6B, the records of result sets 545, 550 are in order, and the problem detector and repairer module 430 performs a partial sorting on these records. Specifically, as shown in FIG. 6B, the problem detector and repairer module 430 partials sorts the records "(1,2)(1,1)" into "(1,1)(1,2)." As shown in FIG. 6B, the records of the result sets 545, 555 are an equal result set, and therefore match. In view of determining the records of result sets 545, 555 match, the problem detector and repairer module 430 identifies these result sets as a correct result set, thereby generating a test result 615. In this way, the problem detector and repairer module 430 generates test results 605, 615 by designating matching results sets as the test results 605, 615. Alternatively, under Scenario 2.2 of FIG. 6B, the records of result sets 545, 555 are not in order, and therefore no sorting on the records occurs. Accordingly, under Scenario 2.2, no generation of the test result 615 occurs.

In embodiments, for group 600a, the problem detector and repairer module 430 does not sort the records. As shown in FIGS. 6C and 6D, the problem detector and repairer module 430 does not sort the records of the result sets 540, 550. Specifically, for a first SQL query (SQL1), the records of C1 and C2 from T1 are shown for the result sets 540, 550. In this example, Scenario 1.1 illustrates that the records are in order. However, even though the records are in order, the records of the result sets 540, 550 do not match and therefore are a record fail. In this way, no generation of a test result 605 under Scenario 1.1 occurs. As a further example, under Scenario 1.2, the records are not in order and therefore are an order fail. In this way, no generation of a test result 605 under Scenario 1.2 occurs. Accordingly, group 600*a* does not generate a test result 605 since the records of the result sets 540, 550 do not match.

Figure 6E:
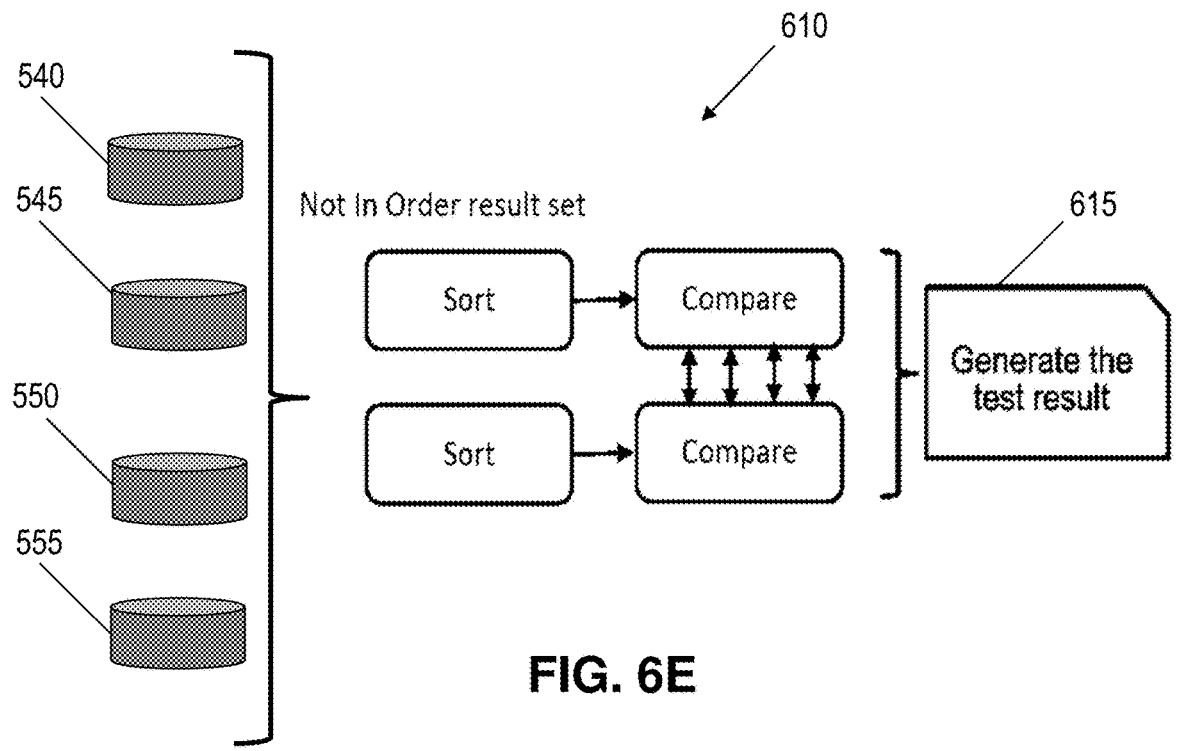
Figure 6F:
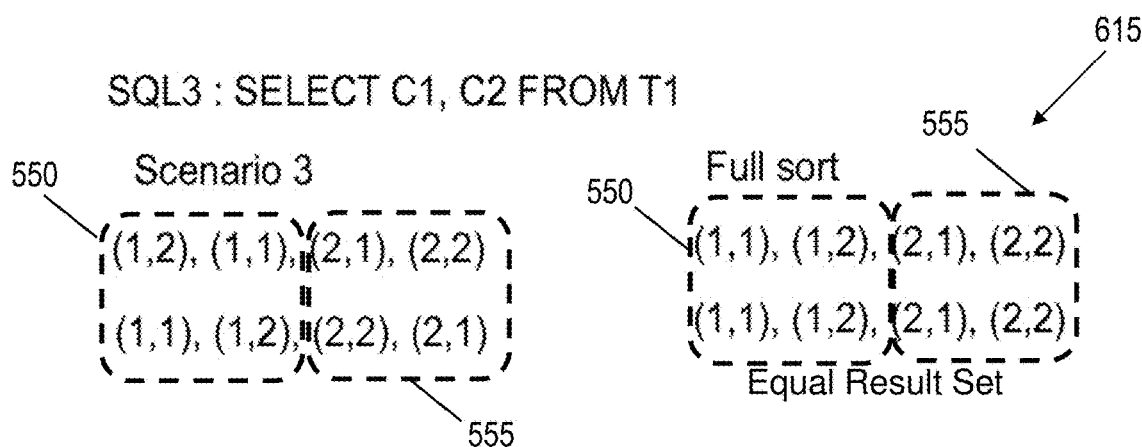

In embodiments, as shown in FIGS. 6E and 6F for group 610, the problem detector and repairer module 430 sorts the records of result sets 550, 555 which are not in order. Specifically, FIG. 6F illustrates the records of C1 and C2 from T1. In this example, after a full sort of the records, the records of the result sets 550, 555 match, which indicates an equal result. In view of determining this match, the problem detector and repairer module 430 determines these result sets 550, 555 are correct, thereby generating a test result 615. In embodiments, the problem detector and repairer module 430 normalizes the execution structures 525, 530, 535 prior to comparing the result sets execution structures 525, 530, 535 to reduce a calculation of the result sets 540, 545, 550, 555, an execution of the execution structures 525, 530, 535, and a comparison effort of the result sets 540, 545, 550, 555.

Figure 7:
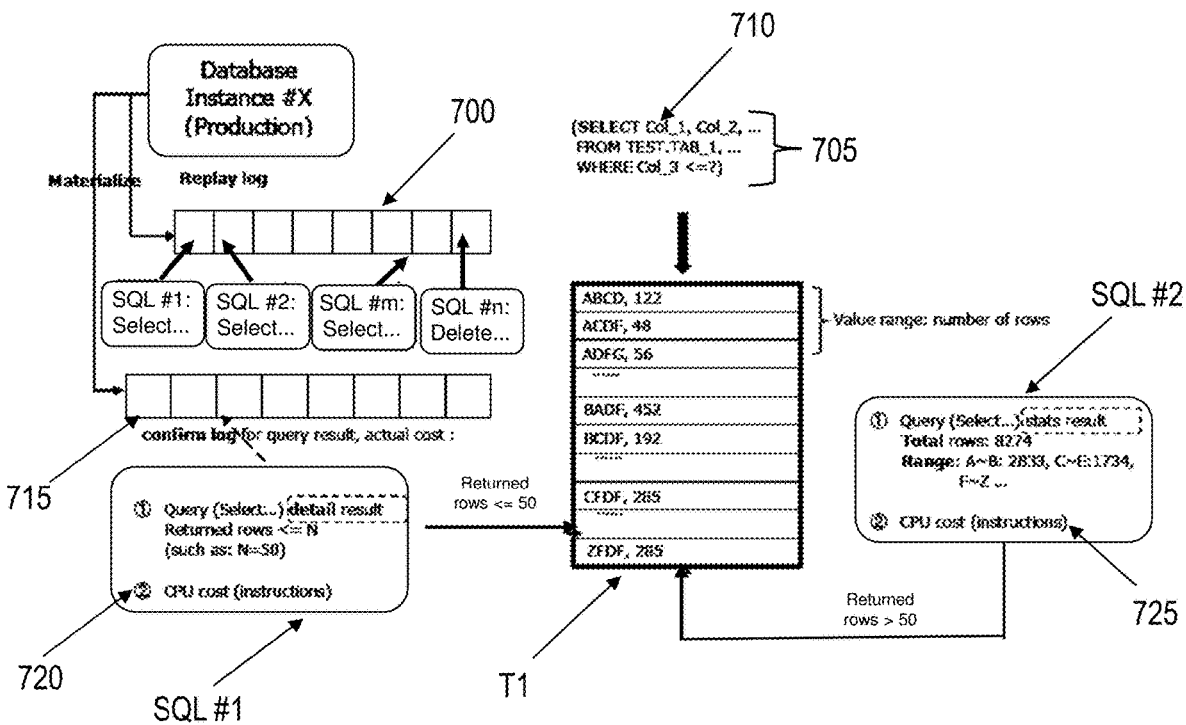
FIG. 7 shows an addition of a replay log and a confirm log in accordance with aspects of the invention.

FIG. 7 illustrates a building of logs 700, 715 in accordance with aspects of the invention. In embodiments, the problem detector and repairer module 430 of FIG. 4 builds the logs 700, 715, which record information regarding the SQL query, and is described with reference to elements depicted in FIGS. 4, 5A-5D, and 6A-6F.

In embodiments, the problem detector and repairer module 430 builds a replay log 700 in the database 440. In embodiments, the problem detector and repairer module 430 uses the replay log 700 to record various information of SQL queries which were run, including the SQL queries re-running the original SQL query using the different execution structures 525, 530, 535, along with information for re-running of the original SQL query within the different database 480 using the different execution structures 525, 530, 535. In embodiments, the information which the replay log 700 records includes a SQL execution sequence 705, a SQL text 710, and a corresponding active transaction ID list, amongst other examples. In embodiments, the SQL execution sequence 705 includes all the operators in an execution structure. In further embodiments, the SQL text 710 is a syntax for carrying out these operators. In embodiments, the transaction ID list contains a list of transaction IDs, with each transaction ID representing an execution of a specific SQL query. As shown in FIG. 7, the replay log 700 contains information for various SQL queries, e.g., SQL #1, SQL #2, . . . SQL #m, SQL #n, resulting from the re-running of the original SQL query using the different execution structures 525, 530, 535. As an example, SQL #1 represents the re-running of the original SQL query using the execution structure 525, amongst other examples. As a further example, the information in the replay log 700 includes the SQL execution sequence 705, e.g., Select, for SQL #1. In this example, the SQL execution sequence 705 instructs the selection of column 1 and column 2 from the table T1.

In embodiments, the problem detector and repairer module 430 also builds a confirm log 715 in the database 440. In embodiments, the problem detector and repairer module 430 uses the confirm log 715 to record additional information relating to the various SQL queries, e.g., SQL #1, SQL #2, . . . SQL #m, SQL #n. In embodiments, the additional information includes a result set of the SQL queries, including the test results 605, 615. In further embodiments, the additional information of the SQL queries includes performance parameters 720, 725 of the SQL queries in the confirm log 715. In embodiments, the performance parameters 720, 725 include a CPU cost for SQL correctness and performance issue verification. As an example, the confirm log 715 contains the CPU cost for SQL #1, with SQL #1 having an execution structure which returns less than or equal to 50 rows of data from table T1, while SQL #2 has an execution structure which returns greater than 50 rows of data from table T1. In embodiments, the information within the replay log 705 and the confirm log 710 is real time information since recording occurs during execution of the SQL query.

Figure 8A:
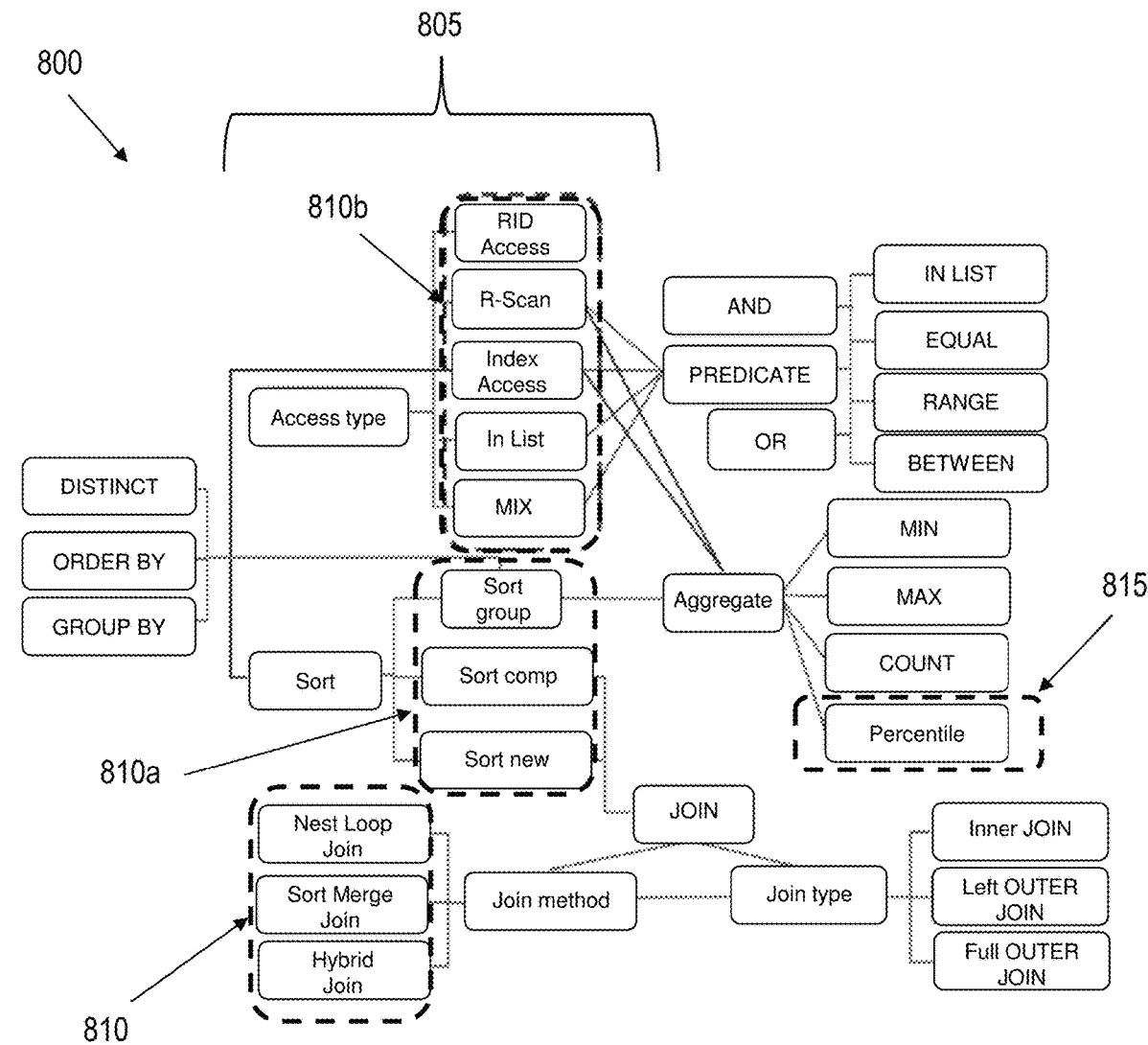
FIGS. 8A and 8B show a generation of an execution structure matrix in accordance with aspects of the invention.
Figure 8B:
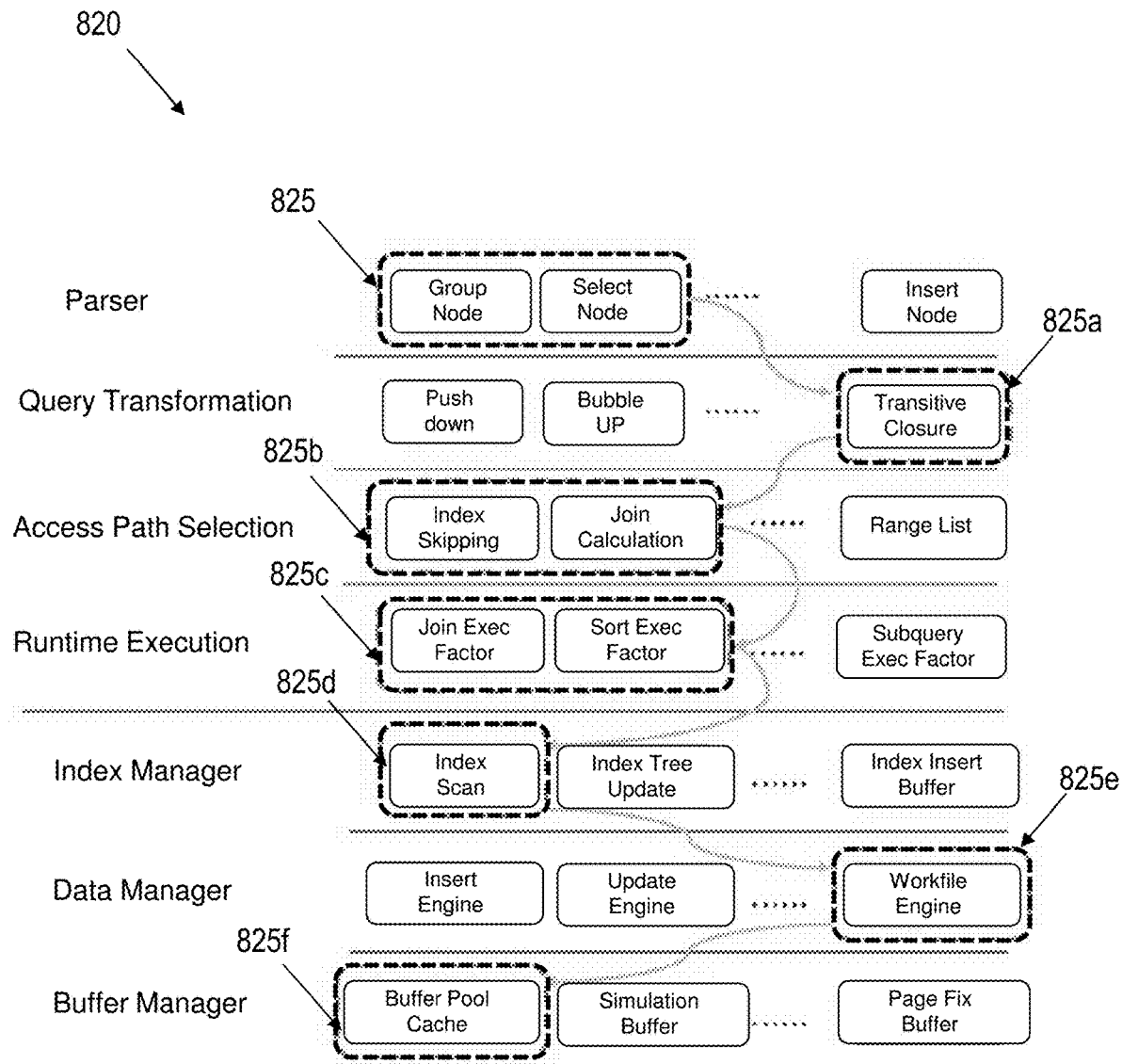

FIGS. 8A and 8B illustrate an execution structure matrix 800 for generating a new access plan 805 and corresponding candidate execution structure 820 in accordance with aspects of the invention. In embodiments, the problem detector and repairer module 430 of FIG. 4 generates an execution structure matrix 800 in view of the information within the logs 700, 715, and is described with reference to elements depicted in FIGS. 4, 5A-5D, 6A-6F, and FIG. 7.

In embodiments, the problem detector and repairer module 430 builds the execution structure matrix 800 in view of the information within the replay log 700, which includes real time information from the SQL queries SQL #1, SQL #2, . . . SQL #m, SQL #n. As shown in FIG. 8A, the execution structure matrix 800 includes a new access plan 805. In embodiments, the new access plan 805 includes components 810, 810*a*, 810*b*. Specifically, components 810*b* are new components which were not in an original access plan of the original SQL query, while components 810, 810*a* are present in the original access plan of the original SQL query. In further embodiments, a new component 815 also represents a new action which is not in the original execution structure matrix of the original SQL query.

In embodiments, the problem detector and repairer module 430 normalizes an original SQL query using a candidate execution structure 820 of the new access plan 805. In embodiments, the new access plan 805 contains the candidate execution structure 820, with the candidate execution structure 820 detailing a logical path of operators for executing the statements of a SQL query. As shown in FIG. 8B, the candidate execution structure 820 contains new operators 825, 825*a*, 825*b*, 825*c*, 825*d*, 825*e*, 825*f* for performing at various levels within the database 440. As an example, within a "Parser" level of the database 440, the candidate execution structure 820 includes new operators 825, i.e., "Group Node" and "Select Node." Further, within a "Query Transformation" level of the database 440, the candidate execution structure 820 includes new operators 825*a*, i.e., "Transitive Closure." Additionally, within an "Access Path Selection" level of the database 440, the candidate execution structure 820 includes new operators 825*b*, i.e., "Index Skipping" and "Join Calculation." In addition, within a "Runtime Execution" level of the database 440, the candidate execution structure 820 includes new operators 825*c*, i.e., "Join Exec Factor" and "Sort Exec Factor." Further, within an "Index Manager" level of the database 440, the candidate execution structure 820 includes new operator 825*d*, i.e., "Index Scan." Additionally, within a "Data Manager" level of the database 440, the candidate execution structure 820 includes new operator 825*e*, i.e., "Workfile Engine." In addition, within a "Buffer Manager" level of the database 440, the candidate execution structure 820 includes new operator 825*f*, i.e., "Buffer Pool Cache."

FIGS. 9A-9D illustrate a generation of a normalized SQL query 925 from an SQL query 900 in accordance with aspects of the invention. In embodiments, the problem detector and repairer module 430 of FIG. 4 normalizes the SQL query 900 using the candidate execution structure 820 of FIGS. 8A and 8B, and is described with reference to elements depicted in FIGS. 4, 5A-5D, 6A-6F, 7, 8A, and 8B. In embodiments, the SQL query is the original SQL query which the problem detector and repairer module 430 receives from the user.

Figure 9A:
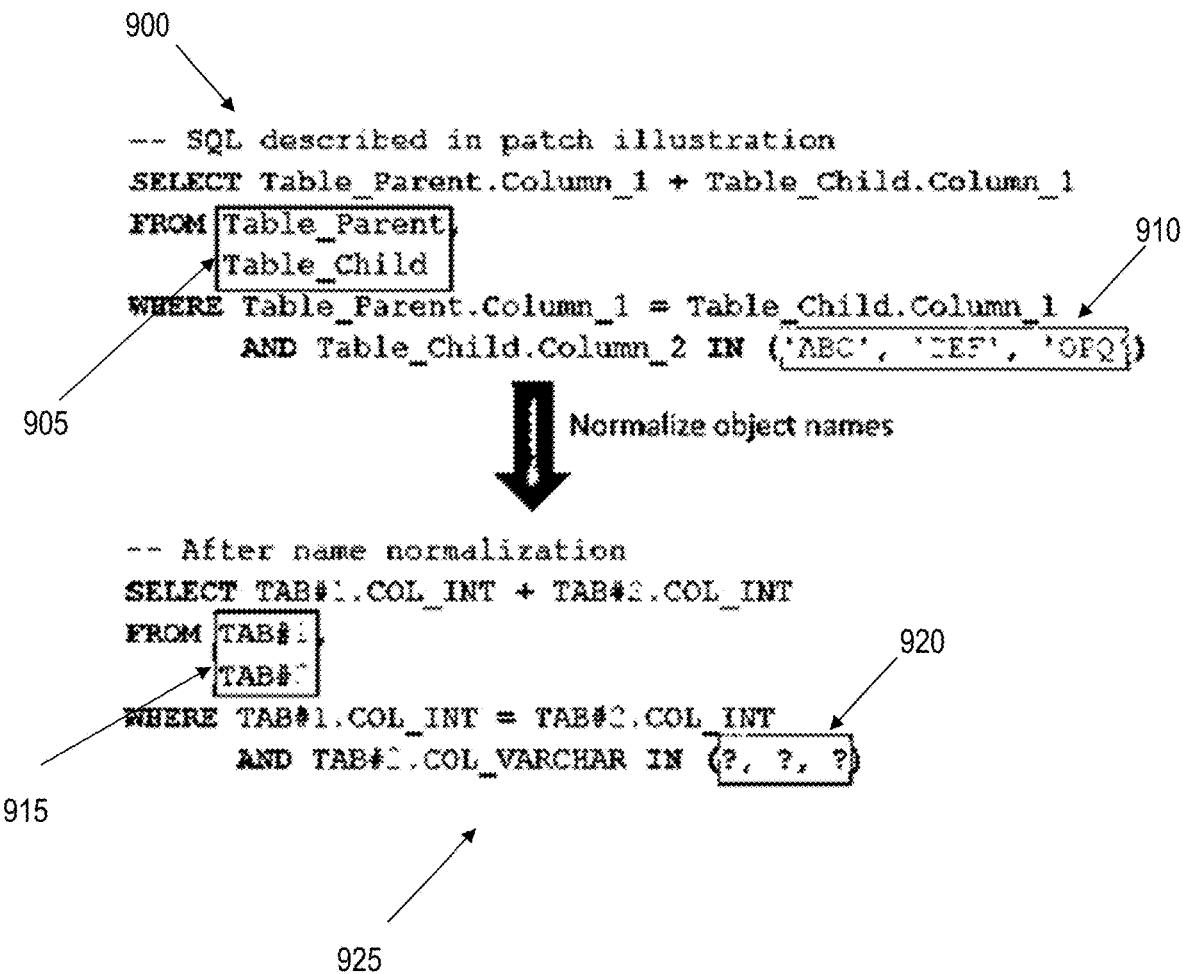
FIGS. 9A-9D show a generation of a normalized SQL query in view of the execution structure matrix of FIGS. 8A and 8B in accordance with aspects of the invention.
Figure 9B:
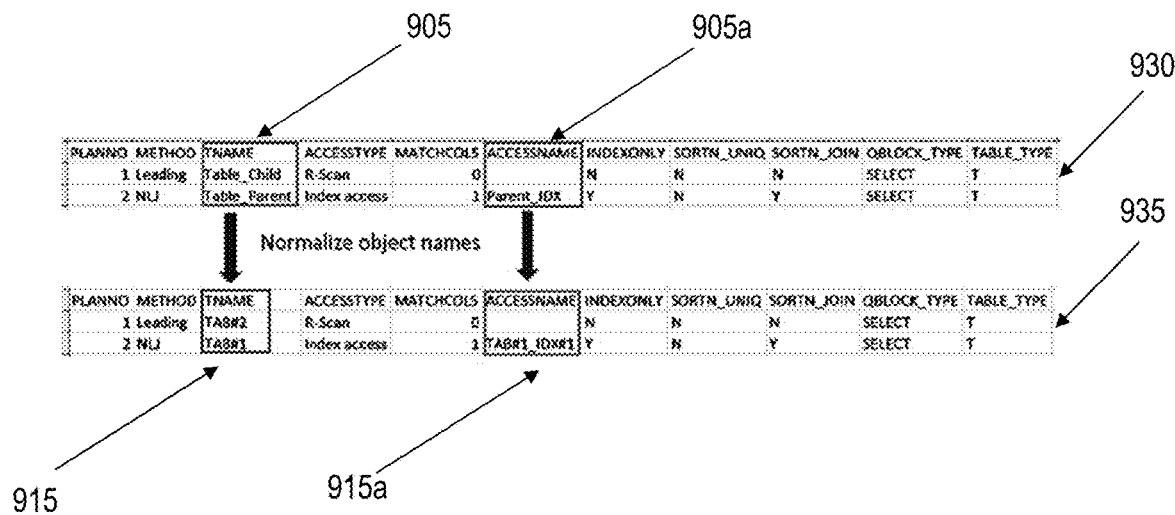
Figure 9C:
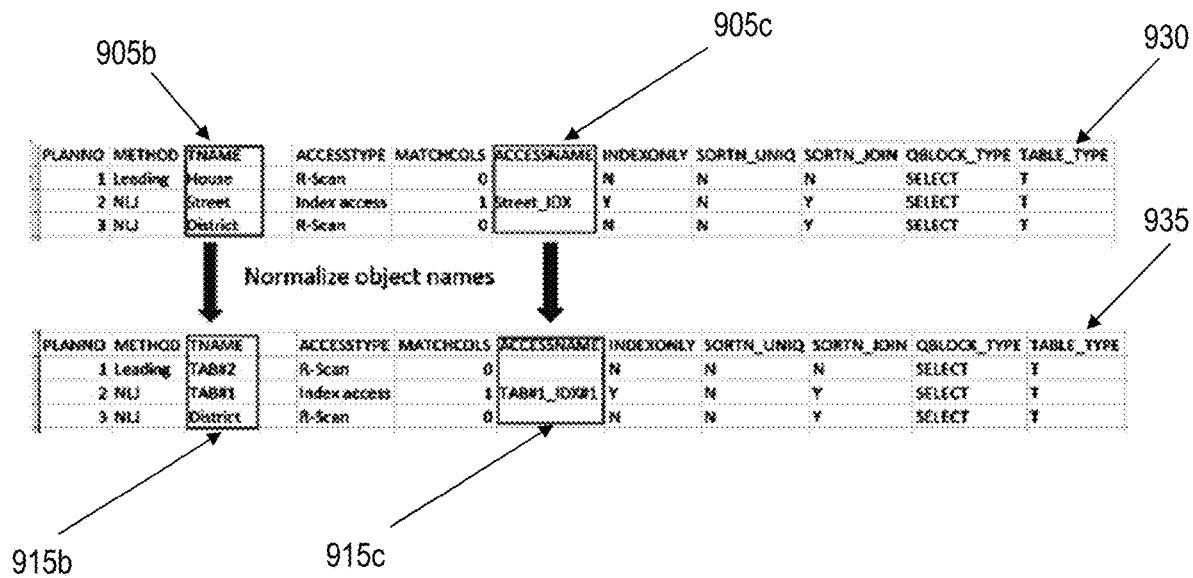

In embodiments, the problem detector and repairer module 430 normalizes the SQL query 900 using the candidate execution structure 820 to normalize an original access plan 930 of the SQL query 900, thereby generating a normalized SQL query 925 having a normalized access plan 935 as shown in FIGS. 9A-9C. In embodiments, the problem detector and repairer module 430 normalizes the original access plan 930 using the candidate execution structure 820 by changing various components of the SQL query 900, thereby generating a normalized SQL query 925. As an example, the problem detector and repairer module 430 normalizes object names 905 within statements of the SQL query 900 in view of the candidate execution structure 820. In embodiments, the object names 905, 905a, 905b, 905c represent names of tables and names of columns within these tables. As an example, as shown in FIGS. 9A-9C, the problem detector and repairer module 430 normalizes the object names 905 of "Table_Parent" and "Table_Child" to object names 915 of "TAB #1" and "TAB #2" in the normalized SQL query 925. As shown in FIGS. 9B and 9C, the problem detector and repairer module 430 also normalizes object names 905a, 905b, 905 into object names 915a, 915b, 915c.

In embodiments, the problem detector and repairer module 430 also normalizes literal values 910 into general values 920 to ignore constants within the literal values 910. As an example, the problem detector and repairer module 430 replaces the constants with question marks. In embodiments, the problem detector and repairer module 430 retains keywords from the original SQL query 820, e.g., SELECT, FROM, WHERE, GROUP BY, HAVING, and ORDER BY, amongst other examples.

Figure 9D:
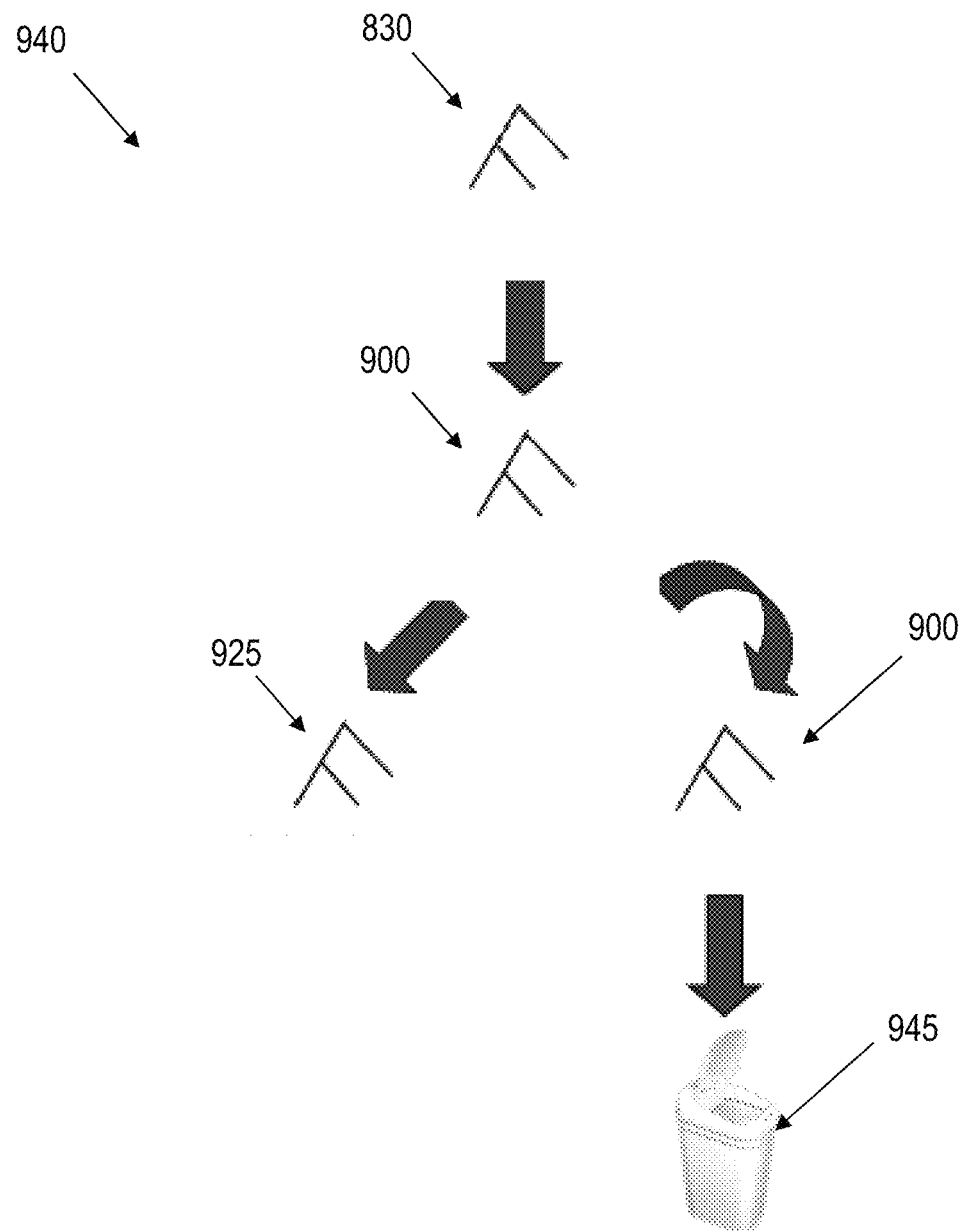

In embodiments, FIG. 9D illustrates a schematic 940 of the problem detector and repairer module 430 normalizing the SQL query 900 to generate the normalized SQL query 925. In embodiments, the problem detector and repairer module 430 normalizes the SQL query 900 using a multi-copy concept. In embodiments, in response to generating the normalized SQL query 925, the problem detector and repairer module 430 deletes 945 the SQL query 900.

Figure 10:
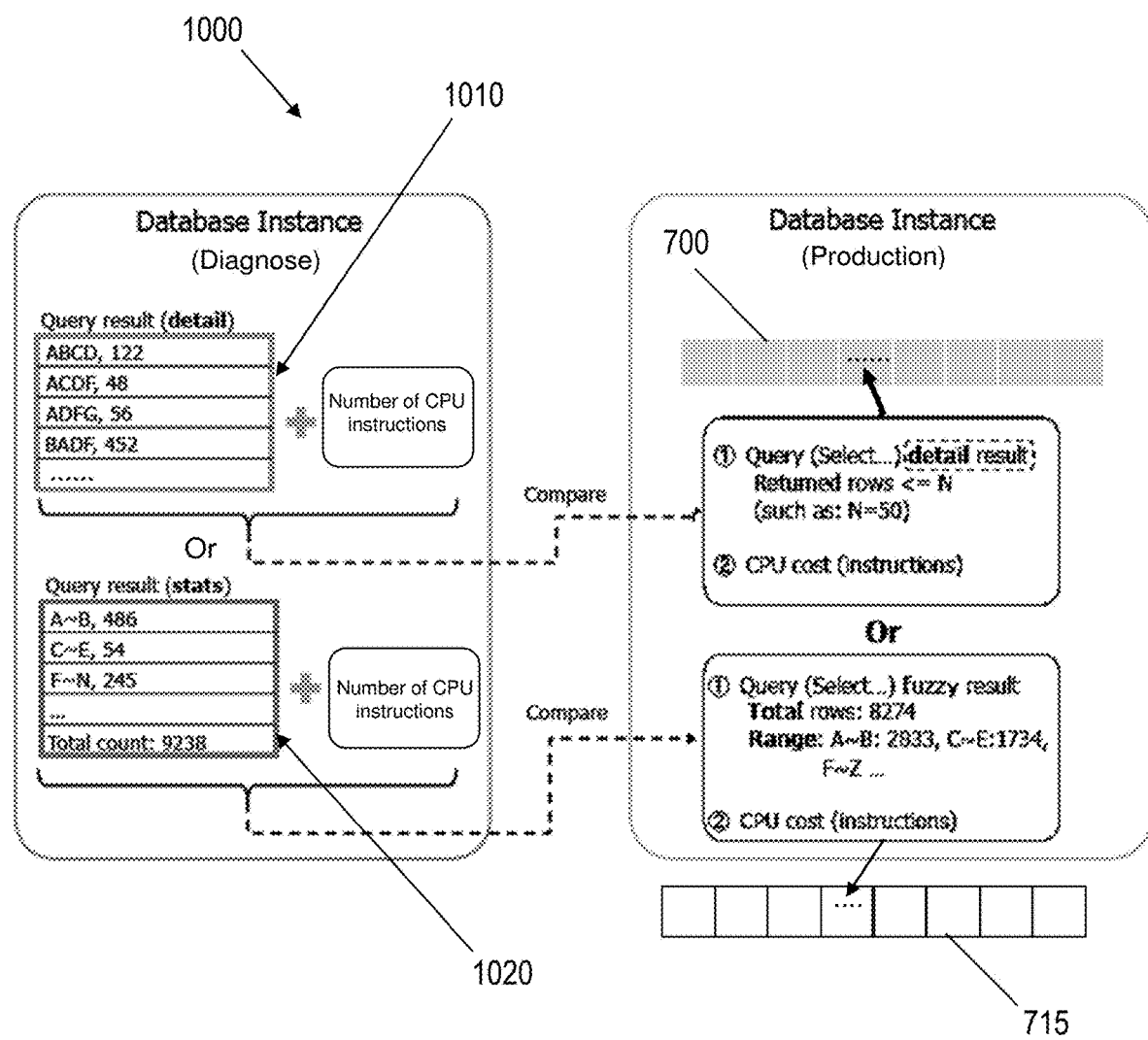
FIG. 10 shows diagnosing a problem in accordance with aspects of the invention.

FIG. 10 illustrates a diagnosis 1000 of a problem in accordance with aspects of the invention. In embodiments, the problem detector and repairer module 430 of FIG. 4 diagnoses whether a problem arises from the SQL query 900 running the normalized SQL query 925 and getting results 1010, 1020. In embodiments, the problem detector and repairer module 430 compares the results 1010, 1020 to the test results 605, 615, and is described with reference to elements depicted in FIGS. 4, 5A-5D, 6A-6F, 7, 8A, 8B, and 9A-9D.

In embodiments, the problem detector and repairer module 430 performs the diagnosis by running the normalized SQL query 925 in the database 440 and obtaining the results 1010, 1020. In embodiments, in response to obtaining the results 1010, 1020, the problem detector and repairer module 430 compares records within the results 1010, 1020 to records within the test results 605, 615. In embodiments, the problem detector and repairer module 430 retrieves the test results 605, 615 from the confirm log 715 in the database 440.

In embodiments, in response to a match between the records within the results 1010, 1020 and the records within the test results 605, 615, the problem detector and repairer module 430 diagnoses the problem as occurring in the SQL query 900. In embodiments, because the results 1010, 1020 of the normalized SQL query 925 match the test results 605, 615, the results 1010, 1020 are correct. Accordingly, the problem detector and repairer module 430 determines the problem occurs in the SQL query 900 since the normalized SQL query 925 retrieves the results 1010, 1020, which are correct. In embodiments, in response to the results 1010, 1020 being correct, the problem detector and repairer module 430 ends the process.

In embodiments, the problem detector and repairer module 430 sends the normalized SQL query 925 to the user for verification. In embodiments, the user runs the normalized SQL query 925 and verifies that the results 1010, 1020 are correct in view of their database knowledge.

In embodiments, in response to the results 1010, 1020 not matching the test results 605, 615, the problem detector and repairer module 430 diagnoses the problem as occurring in the database 440. In embodiments, the problem detector and repairer module 430 compares information from either or both the logs 700, 715 to information in the normalized SQL query 925 to verify that the information of the normalized SQL query 925 matches the information of an SQL query which retrieves the test results 605, 615. As an example, SQL #1 retrieves the test results 605, while SQL #2 retrieves the test results 615. In embodiments, the problem detector and repairer module 430 compares SQL text from the normalized SQL query 925 to the SQL text 710 to verify that the information of the normalized SQL query 925 matches the information of an SQL query which retrieves the test results 605, 615. In response to the results 1010, 1020 not matching the test results 605, 615, and the information of the normalized SQL query 925 not matching the information of an SQL query which retrieves the test results 605, 615, the problem detector and repairer module 430 diagnoses the problem as occurring in the database 440. As another example, the problem detector and repairer module 430 compares the performance parameters 720, 725 from the confirm log 715 to performance parameters of the SQL query.

Figure 11:
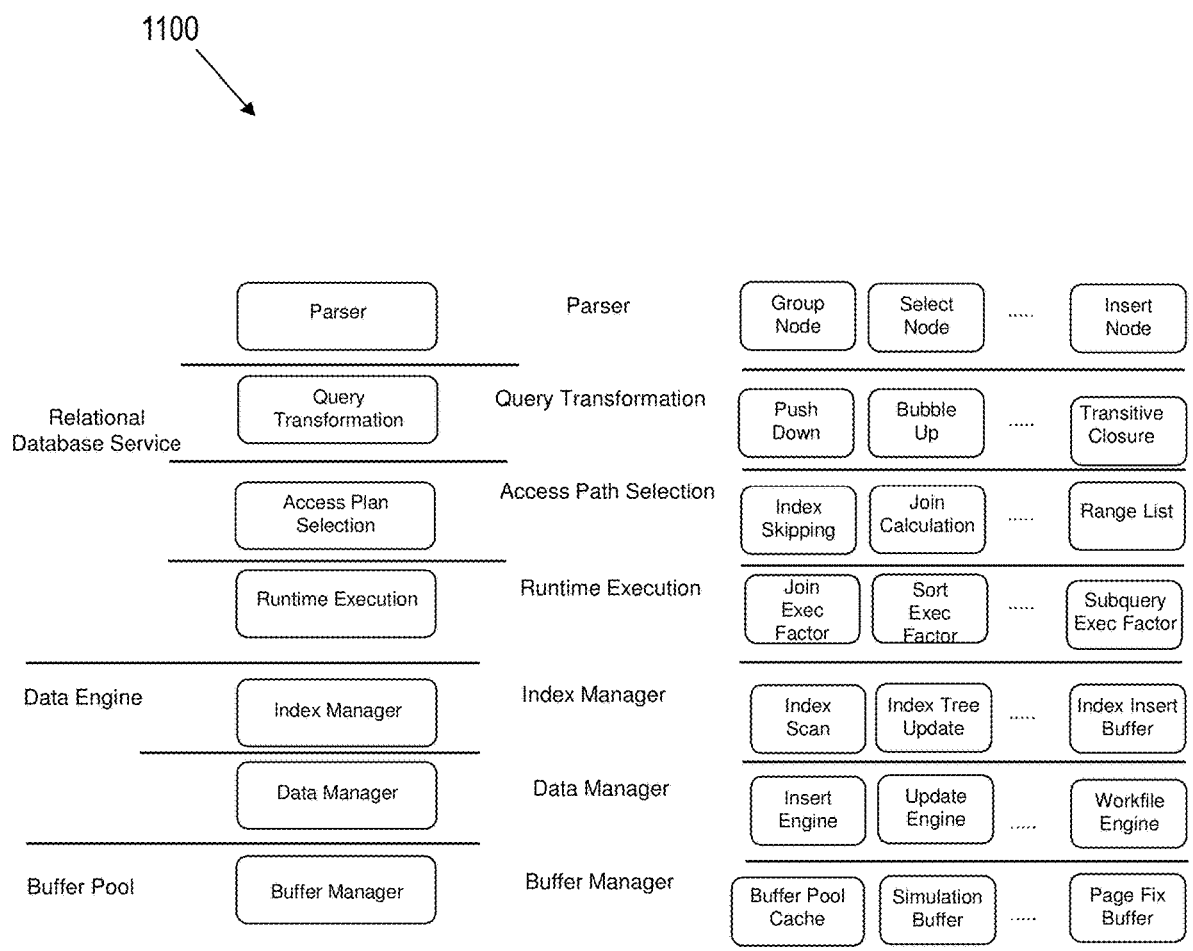
FIG. 11 shows levels in a database in accordance with aspects of the invention.

FIG. 11 illustrates levels 1100 of the database 440 in accordance with aspects of the invention. In embodiments, to the problem detector and repairer module 430 diagnosing the problem as occurring in the database 440, the user receives the notification that the problem is within the database 440, and is described with reference to elements depicted in FIGS. 4, 5A-5D, 6A-6F, 7, 8A, 8B, 9A-9D, and 10.

In embodiments, in response to the problem detector and repairer module 430 diagnosing the problem as occurring in the database 440, the problem detector and repairer module 430 notifies the user that the problem exists within the database 440. In embodiments, the problem detector and repairer module 430 notifies the user that the problem is occurring in the database 440 by sending a message through the network 410 for display on the display device 470 of the computing device 450.

In embodiments, in response to receiving the notification from the problem detector and repairer module 430, the user determines a repair for the database 440. As an example, the user applies a patch to a level of the levels 1110 of the database 440 as a repair. An example of a level of the levels 1110 of the database 440 is an "Parser" level within a "Relational Database Service" section of the database 440. As another example, a level of the levels 1110 of the database 440 is an "Index Manager" level within a "Data Engine" section of the database 440. As a further example, a level of the levels 1110 of the database 440 is a "Buffer Manager" level within a "Buffer Pool" section of the database 440.

In embodiments, in view of the user's database knowledge, the user determines which patch is applicable from a database patch center. In embodiments, the patch repairs at least one level of the levels 1110 of the database 440. As an example, a problem is within a "Parser" level of the database 440. In view of the user's database knowledge, the user knows which patch from the database patch center is for repairing the "Parser" level.

In embodiments, the problem detector and repairer module 430 implements a learning phase to train a knowledge center for addressing problems in the future. During the learning phase, the problem detector and repairer module 430 uses machine learning to learn which repair is applicable for a problem in the database 440. Specifically, as the user applies the patch, the problem detector and repairer module 430 compiles repair data as training data. In embodiments, the training data includes which level of the levels 1110 the problem is present within, and which patch corresponds to this level. As the training data compiles over time, the problem detector and repairer module 430 trains a knowledge center using the training data so that the knowledge center includes which repairs belong to which problems. In embodiments, the knowledge center resides within the database 440 and is accessible by the problem detector and repairer module 430 through the network 410. Accordingly, as the knowledge center grows to include repairs for different problems, the problem detector and repairer module 430 is able to determine which repair is applicable.

Figure 12A:
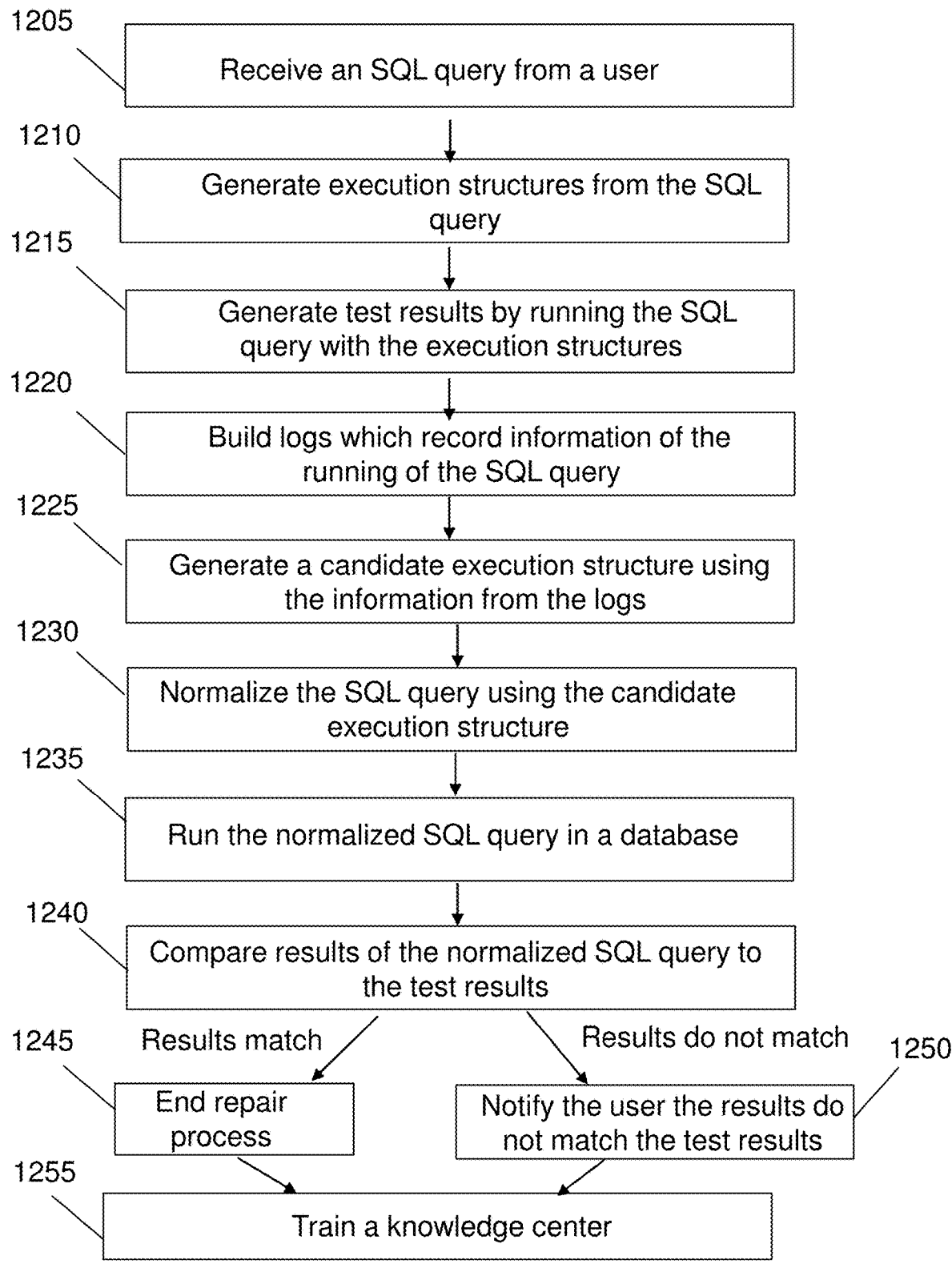
FIGS. 12A-12C show flowcharts of an exemplary method in accordance with aspects of the invention.
Figure 12B:
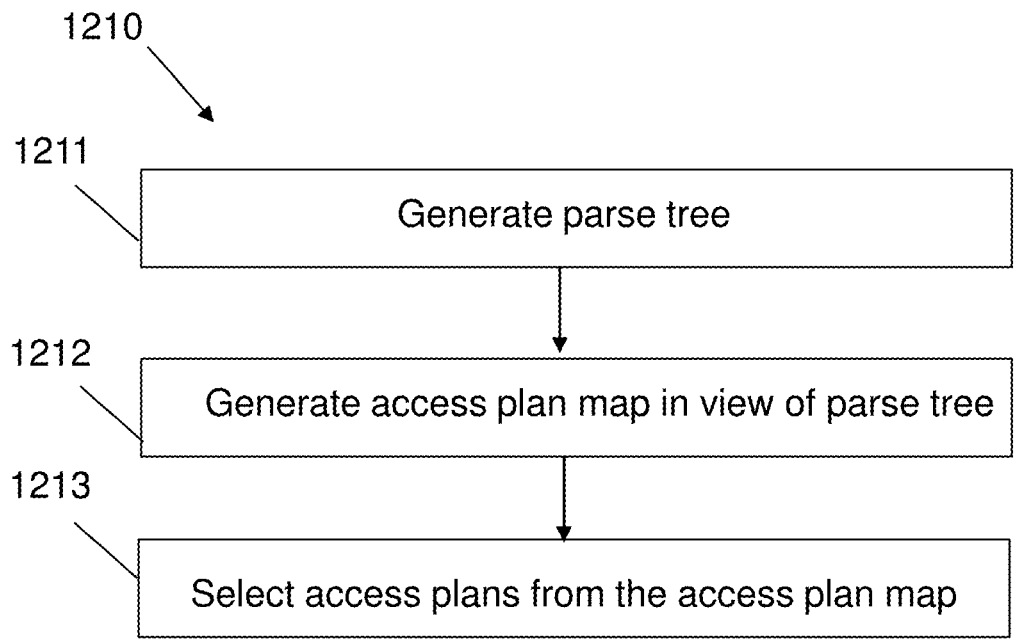
Figure 12C:
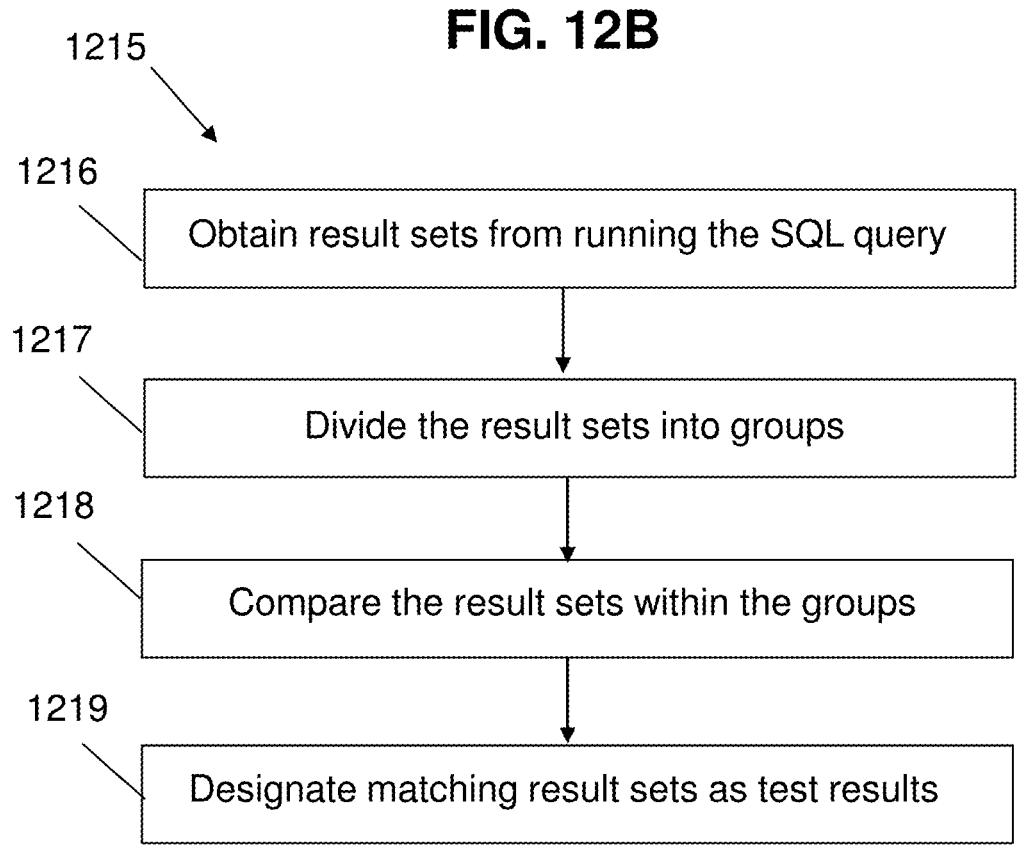

FIGS. 12A-12C show flowcharts of an exemplary method in accordance with aspects of the present invention. Steps of the method may be carried out in the environment of FIG. 4 and are described with reference to elements depicted in FIGS. 4-11.

At step 1205, the problem detector and repairer module 430 receives an SQL query 900. In embodiments, and as described with respect to FIGS. 4-11, the problem detector and repairer module 430 receives the SQL query 900 from a user. In embodiments, and as described with respect to FIGS. 4-11, the problem detector and repairer module 430 receives the SQL query 900 from the user through the network 410 in response to the user sending the SQL query 900 using the input device 460 of the computing device 450.

At step 1210, the problem detector and repairer module 430 generates the execution structures 525, 530, 535 from the SQL query 900. In embodiments, and as described with respect to FIGS. 4-11, the problem detector and repairer module 430 generates the execution structures 525, 530, 535 for re-running of the SQL query 900.

In embodiments, steps 1211-1213 shown in FIG. 12B are sub-steps of step 1210 of FIG. 12A. At step 1211, the problem detector and repairer module 430 begins generating the execution structures 525, 530, 535 from the SQL query 900 by generating a parse tree 500. In embodiments, and as described with respect to FIGS. 4-11, the problem detector and repairer module 430 generates the parse tree 500 by parsing syntax within statements of the SQL query 900.

At step 1212, in response to generating the parse tree 500, the problem detector and repairer module 430 generates an access plan map 505 in view of the parse tree 500. In embodiments, and as described with respect to FIGS. 4-11, the access plan map 505 contains a plurality of access plans for satisfying the nodes and branches of the parse tree 500.

At step 1213, in response to generating the access plan map 505, the problem detector and repairer module 430 selects access plans 510, 515, 520 from the access plan map 505. In embodiments, and as described with respect to FIGS. 4-11, the problem detector and repairer module 430 selects access plans 510, 515, 520 in view of policies, e.g., a cost policy.

At step 1215, the problem detector and repairer module 430 generates the test results 605, 615 by running the SQL query using the execution structures 525, 530, 535. In embodiments, and as described with respect to FIGS. 4-11, the problem detector and repairer module 430 generates the test results 605, 615 by running the SQL query 900 using the execution structures 525, 530, 535 within the database 440 and the different database 480.

In embodiments, steps 1216-1219 shown in FIG. 12C are sub-steps of step 1215 of FIG. 12A. At step 1216, to generate the test results 605, 615, the problem detector and repairer module 430 obtains result sets from running the SQL query. In embodiments, and as described with respect to FIGS. 4-11, the problem detector and repairer module 430 obtains result sets result sets 540, 545, 550, 555 by running the SQL query 900 as SQL queries, i.e., SQL #1, SQL #2, . . . SQL #m, SQL #n, in the database 440 and the different database 480 using the execution structures 525, 530, 535.

At step 1217, to generate the test results 605, 615, the problem detector and repairer module 430 divides the result sets 540, 545, 550, 555 into groups 600, 600a. In embodiments, and as described with respect to FIGS. 4-11, the problem detector and repairer module 430 groups the result sets 540, 545, 550, 555 into groups 600, 600a, 610 in view of records within the result sets 540, 545, 550, 555 being in order or not being in order.

At step 1218, to generate the test results 605, 615, the problem detector and repairer module 430 compares the result sets 540, 545, 550, 555 within the groups 600, 600a, 610 to determine a match. In embodiments, and as described with respect to FIGS. 4-11, the problem detector and repairer module 430 compares records within the result sets 540, 545, 550, 555 within the groups 600, 600a, 610 to find matching records.

At step 1219, to generate the test results 605, 615, the problem detector and repairer module 430 designates matching result sets as the test results 605, 615. In embodiments, and as described with respect to FIGS. 4-11, the problem detector and repairer module 430 designates matching result sets as the test results 605, 615 in response to the records matching.

At step 1220, the problem detector and repairer module 430 builds logs 700, 715 which record information of the running of the SQL query. In embodiments, and as described with respect to FIGS. 4-11, the problem detector and repairer module 430 builds a replay log 700 in the database 440 to record various information of the SQL queries re-running the SQL query 900 using the different execution structures 525, 530, 535. In embodiments, and as described with respect to FIGS. 4-11, the problem detector and repairer module 430 also builds a confirm log 715 in the database 440 to record additional information of the SQL queries re-running the SQL query 900 using the different execution structures 525, 530, 535.

At step 1225, the problem detector and repairer module 430 generates a candidate execution structure 820 using the information from the logs 700, 715. In embodiments, and as described with respect to FIGS. 4-11, the problem detector and repairer module 430 generates an execution structure matrix 800 in view of the information from the logs 700, 715. In embodiments, the execution structure matrix 800 includes the new access plan 805. In embodiments, the new access plan 805 contains the candidate execution structure 820.

At step 1230, the problem detector and repairer module 430 normalizes the SQL query 900 using the candidate execution structure 820. In embodiments, and as described with respect to FIGS. 4-11, the problem detector and repairer module 430 normalizes the SQL query 900 by changing various components of the SQL query 900 in view of the candidate execution structure, thereby generating a normalized SQL query 925.

At step 1235, the problem detector and repairer module 430 runs the normalized SQL query 925 in a database 440. In embodiments, and as described with respect to FIGS. 4-11, the problem detector and repairer module 430 runs the normalized SQL query 925 in the database 440 to generate results 1010, 1020.

At step 1240, the problem detector and repairer module 430 compares the results 1010, 1020 of the normalized SQL query 925 to the test results 605, 615. In embodiments, and as described with respect to FIGS. 4-11, the problem detector and repairer module 430 compares results 1010, 1020 to the test results 605, 615 by comparing records within the test results 1010, 1020 to records within the test results 605, 615. At step 1245, in response to the results 1010, 1020 matching the test results 605, 615, the problem detector and repairer module 430 ends a repair process.

At step 1250, in response to the results 1010, 1020 not matching the test results 605, 615, the problem detector and repairer module 430 notifies the user that the results 1010, 1020 do not match the test results 605, 615. In embodiments, and as described with respect to FIGS. 4-11, the problem detector and repairer module 430 notifies the user that the results 1010, 1020 do not match the test results 605, 615 by sending a message through the network 410 for display on the display device 470 of the computing device 450.

At step 1255, the problem detector and repairer module 430 trains a knowledge center. In embodiments, and as described with respect to FIGS. 4-11, the problem detector and repairer module 430 implements a learning phase to train a knowledge center for addressing problems in the future. In embodiments, during the learning phase, the problem detector and repairer module 430 uses machine learning to learn which repair is applicable for a problem in the database 440 in view of a user applying a patch to the database 440.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a Structured Query Language (SQL) query from a user, wherein the SQL query is associated with a problem;
generating, by the computing device, execution structures from the SQL query, the execution structures each including different logical paths for executing statements of the SQL query;
generating, by the computing device, an initial set of test results from one or more databases by running the SQL query using each of the execution structures;
building, by the computing device, logs which record information of the running of the SQL query using each of the execution structures;
generating, by the computing device, a candidate execution structure including new logical paths for executing statements of the SQL query using the information from the logs;
normalizing, by the computing device, components of the SQL query using the candidate execution structure, thereby generating a normalized SQL query;
running, by the computing device, the normalized SQL query in a database, thereby generating a new set of test results;
diagnosing a source of the problem by comparing, by the computing device, the new set of test results of the normalized SQL query to the initial set of test results to determine whether the new set of test results matches the initial set of test results;
in response to a user applying a repair to the database, compiling repair data of the repair as training data; and
training a knowledge center using machine learning with the training data.

2. The method of claim 1, further comprising, in response to determining the new set of test results of the normalized SQL query match the initial set of test results, ending a repair process.

3. The method of claim 1, further comprising, in response to determining the new set of test results of the normalized SQL query do not match the initial set of test results, notifying the user that the new set of test results do not match the initial set of test results.

4. The method of claim 1, wherein the generating the execution structures from the SQL query includes generating a parse tree.

5. The method of claim 4, wherein the generating the execution structures from the SQL query includes generating an access plan map using the parse tree.

6. The method of claim 5, wherein the generating the execution structures from the SQL query includes selecting access plans from the access plan map.

7. The method of claim 1, wherein the generating the initial set of test results includes dividing the initial set of test result into groups.

8. The method of claim 7, wherein the generating the initial set of test results includes comparing result sets within the groups.

9. The method of claim 8, wherein the generating the initial set of test results includes designating matching result sets as the initial set of test results.

10. The method of claim 1, wherein the computing device includes software provided as a service in a cloud environment.

11. The computer program product of claim 7, wherein the program instructions are executable to, in response to determining the new set of test results of the normalized SQL query do not match the initial set of test results, notify the user the new set of test results do not match the initial set of test results.

12. The method of claim 1, further comprising using the trained knowledge center to diagnose a second SQL query for repairing the second SQL query or the one or more databases in response to a second problem.

13. A computer program product comprising one or more computer readable storage media having program instructions collectively stored on the one or more computer readable storage media, the program instructions executable to:
 receive an SQL query from a user, wherein the SQL query is associated with a problem;
 generate execution structures from the SQL query, the execution structures each including different logical paths for executing statements of the SQL query;
 generate an initial set of test results from one or more databases by running the SQL query using each of the execution structures;
 build logs which record information of the running of the SQL query using each of the execution structures;
 generate a candidate execution structure including new logical paths for executing statements of the SQL query using the information from the logs;
 normalize components of the SQL query using the candidate execution structure, thereby generating a normalized SQL query;
 run the normalized SQL query in a database, thereby generating a new set of test results;
 diagnose a source of the problem by comparing the new set of test results of the normalized SQL query to the initial set of test results to determine whether the new set of test results matches the initial set of test results;
 in response to a user applying a repair to the database, compile repair data of the repair as training data; and
 train a knowledge center using machine learning with the training data.

14. The computer program product of claim 13, wherein the program instructions are executable to, in response to determining the new set of test results of the normalized SQL query match the initial set of test results, end a repair process.

15. The computer program product of claim 13, wherein the information from the logs includes at least one of a SQL execution sequence, a SQL text, and a corresponding active transaction ID list.

16. The computer program product of claim 13, wherein the program instructions are executable to compile repair data in response to the user applying a patch to the database.

17. A system comprising:
 a processor, a computer readable memory, one or more computer readable storage media, and program instructions collectively stored on the one or more computer readable storage media, the program instructions executable to:
 receive an SQL query from a user, wherein the SQL query is associated with a problem;
 generate execution structures from the SQL query, the execution structures each including different logical paths for executing statements of the SQL query;
 generate an initial set of test results by running the SQL query using each of the execution structures;
 build logs which record information of the running of the SQL query using each of the execution structures;
 generate a candidate execution structure including new logical paths for executing statements of the SQL query using the information from the logs;
 normalize components of the SQL query using the candidate execution structure, thereby generating a normalized SQL query;
 run the normalized SQL query in a database, thereby generating a new set of test results;
 diagnose a source of the problem by comparing the new set of test results of the normalized SQL query to the initial set of test results to determine whether the new set of test results matches the initial set of test results;
 in response to a user applying a repair to the database, compile repair data of the repair as training data; and
 train a knowledge center using machine learning with the training data.

18. The system of claim 17, wherein the information from the logs includes performance parameters of running the SQL query with the execution structures, and the performance parameters include a CPU cost.

19. The system of claim 17, wherein the SQL query retrieves data from a table within the database.

20. The system of claim 17, wherein the program instructions are executable to, in response to determining the new set of test results of the normalized SQL query match the initial set of test results, end the repair process.

\* \* \* \* \*